US012333128B2

United States Patent
Rogers et al.

(10) Patent No.: US 12,333,128 B2
(45) Date of Patent: Jun. 17, 2025

(54) INTELLIGENT MANIPULATION OF DYNAMIC DECLARATIVE INTERFACES

(71) Applicant: Appian Corporation, McLean, VA (US)

(72) Inventors: John Rogers, McLean, VA (US); Charles Tsui, McLean, VA (US); Alison Cowley, McLean, VA (US); Indraja Karnik, McLean, VA (US)

(73) Assignee: Appian Corporation, McLean, VA (US)

( * ) Notice: Subject to any disclaimer, the term of this patent is extended or adjusted under 35 U.S.C. 154(b) by 0 days.

(21) Appl. No.: 18/432,228

(22) Filed: Feb. 5, 2024

(65) Prior Publication Data

US 2024/0256109 A1 Aug. 1, 2024

Related U.S. Application Data

(63) Continuation of application No. 17/712,318, filed on Apr. 4, 2022, now Pat. No. 11,893,218, which is a continuation of application No. 16/393,764, filed on Apr. 24, 2019, now Pat. No. 11,294,555.

(51) Int. Cl.
| | |
|---|---|
| *G06F 3/04845* | (2022.01) |
| *G06F 3/0482* | (2013.01) |
| *G06F 3/0486* | (2013.01) |
| *G06F 8/71* | (2018.01) |
| *G06F 9/451* | (2018.01) |
| *G06F 40/186* | (2020.01) |

(52) U.S. Cl.
CPC ........ *G06F 3/04845* (2013.01); *G06F 3/0482* (2013.01); *G06F 3/0486* (2013.01); *G06F 8/71* (2013.01); *G06F 9/451* (2018.02); *G06F 40/186* (2020.01)

(58) Field of Classification Search
CPC .................................................. G06F 3/04845
USPC .......................................................... 715/763
See application file for complete search history.

(56) References Cited

U.S. PATENT DOCUMENTS

| | | | | |
|---|---|---|---|---|
| 4,717,490 A | * | 1/1988 | Salentine | C10M 125/26 508/159 |
| 7,309,009 B2 | * | 12/2007 | Singer-Harter | G06Q 30/02 235/383 |
| 7,370,315 B1 | * | 5/2008 | Lovell | G06F 8/355 717/109 |

(Continued)

OTHER PUBLICATIONS

"Working screenshot of Visual Studio 2008" manufactured by Microsoft, released on Aug. 11, 2008, 13 pages. (Year: 2008).*

(Continued)

*Primary Examiner* — Reza Nabi
(74) *Attorney, Agent, or Firm* — Fish & Richardson P.C.

(57) ABSTRACT

Systems and techniques that provide improvements to designer applications as described to address, for example, limitations associated with constructing a user interface as it is being designed by a user in a development environment. In some implementations, a system provides a design interface through which a user can view, develop, and test functional aspects of an electronic form in real-time while the user is building the application. The system maintains associations between components of the electronic form and expressions for the components referenced in program logic for the electronic form.

20 Claims, 12 Drawing Sheets

(56) References Cited

U.S. PATENT DOCUMENTS

| | | | | |
|---|---|---|---|---|
| 8,387,006 B1* | 2/2013 | Taylor | G06F 16/958 | 717/110 |
| 8,707,158 B2* | 4/2014 | Wright | G06F 40/174 | 715/221 |
| 9,535,667 B2* | 1/2017 | Bank | G06F 8/34 | |
| 10,553,006 B2* | 2/2020 | Iglehart | G06F 3/04845 | |
| 10,762,799 B1* | 9/2020 | Yang | G09B 5/06 | |
| 11,294,555 B2 | 4/2022 | Rogers et al. | | |
| 11,893,218 B2 | 2/2024 | Rogers et al. | | |
| 2005/0065970 A1* | 3/2005 | King | G06F 8/34 | 707/999.102 |
| 2006/0074730 A1* | 4/2006 | Shukla | G06Q 10/0633 | 705/7.26 |
| 2006/0074731 A1* | 4/2006 | Green | G06Q 10/06316 | 705/7.27 |
| 2006/0074735 A1* | 4/2006 | Shukla | G06Q 50/188 | 705/80 |
| 2006/0150148 A1* | 7/2006 | Beckett | G06F 8/34 | 717/109 |
| 2006/0283941 A1* | 12/2006 | Singer-Harter | G06Q 30/02 | 235/383 |
| 2007/0169100 A1* | 7/2007 | Chamberlain | G06F 8/71 | 717/122 |
| 2007/0226258 A1* | 9/2007 | Lambdin | G02B 23/26 | |
| 2008/0092057 A1* | 4/2008 | Monson | G06F 9/451 | 715/744 |
| 2008/0244443 A1* | 10/2008 | Schaw | G06F 8/38 | 715/788 |
| 2008/0307385 A1* | 12/2008 | Dreiling | G06F 8/38 | 717/108 |
| 2010/0217650 A1* | 8/2010 | Hartnell | G06Q 30/0201 | 705/7.29 |
| 2011/0035654 A1* | 2/2011 | Wright | G06F 40/174 | 715/765 |
| 2011/0320529 A1* | 12/2011 | Mentchoukov | H04L 41/22 | 709/203 |
| 2012/0215543 A1* | 8/2012 | Oz | G06F 8/38 | 704/E15.001 |
| 2013/0212557 A1* | 8/2013 | Edmunds | G06F 8/75 | 717/109 |
| 2014/0250422 A1* | 9/2014 | Bank | G06F 9/451 | 717/109 |
| 2014/0304682 A1* | 10/2014 | Taylor | G06F 9/44 | 717/113 |
| 2015/0160820 A1* | 6/2015 | Leue | G06F 3/0486 | 717/109 |
| 2016/0349975 A1* | 12/2016 | Sugiura | G06V 10/945 | |
| 2019/0354952 A1* | 11/2019 | Yokoyama | G06Q 20/18 | |
| 2020/0125336 A1* | 4/2020 | Mills | G06F 8/35 | |
| 2020/0305579 A1* | 10/2020 | Yang | G06T 19/006 | |
| 2020/0341619 A1* | 10/2020 | Rogers | G06F 9/451 | |
| 2021/0258534 A1* | 8/2021 | Lin | G06V 20/40 | |
| 2021/0304517 A1* | 9/2021 | Barron | G06T 7/254 | |
| 2021/0345016 A1* | 11/2021 | Nakano | G06F 18/2413 | |
| 2021/0390311 A1* | 12/2021 | Barron | G06V 20/41 | |
| 2022/0067380 A1* | 3/2022 | Hsiao | G06F 16/7837 | |
| 2022/0229545 A1* | 7/2022 | Rogers | G06F 3/0482 | |

OTHER PUBLICATIONS

"How to apply conditional visibility Controls" published by Microsoft and available online at [https://docs.microsoft.com/en-us/dynamics-nav/how-to--apply-conditional-visibility-controls], published on Nov. 9, 2017 (Year: 2017).*

"Working Screenshot of Visual Studio 2008," manufactured by Microsoft, released on Aug. 11, 2008, 13 pages.

docs.microsoft.com [online], "How to: Apply Conditional Visibility Controls," Nov. 9, 2017, retrieved on Apr. 13, 2021, retrieved from URL <https://docs.microsoft.com/en-us/dynamics-nav/how-to--apply-conditional-visibility-controls>, 2 pages.

* cited by examiner

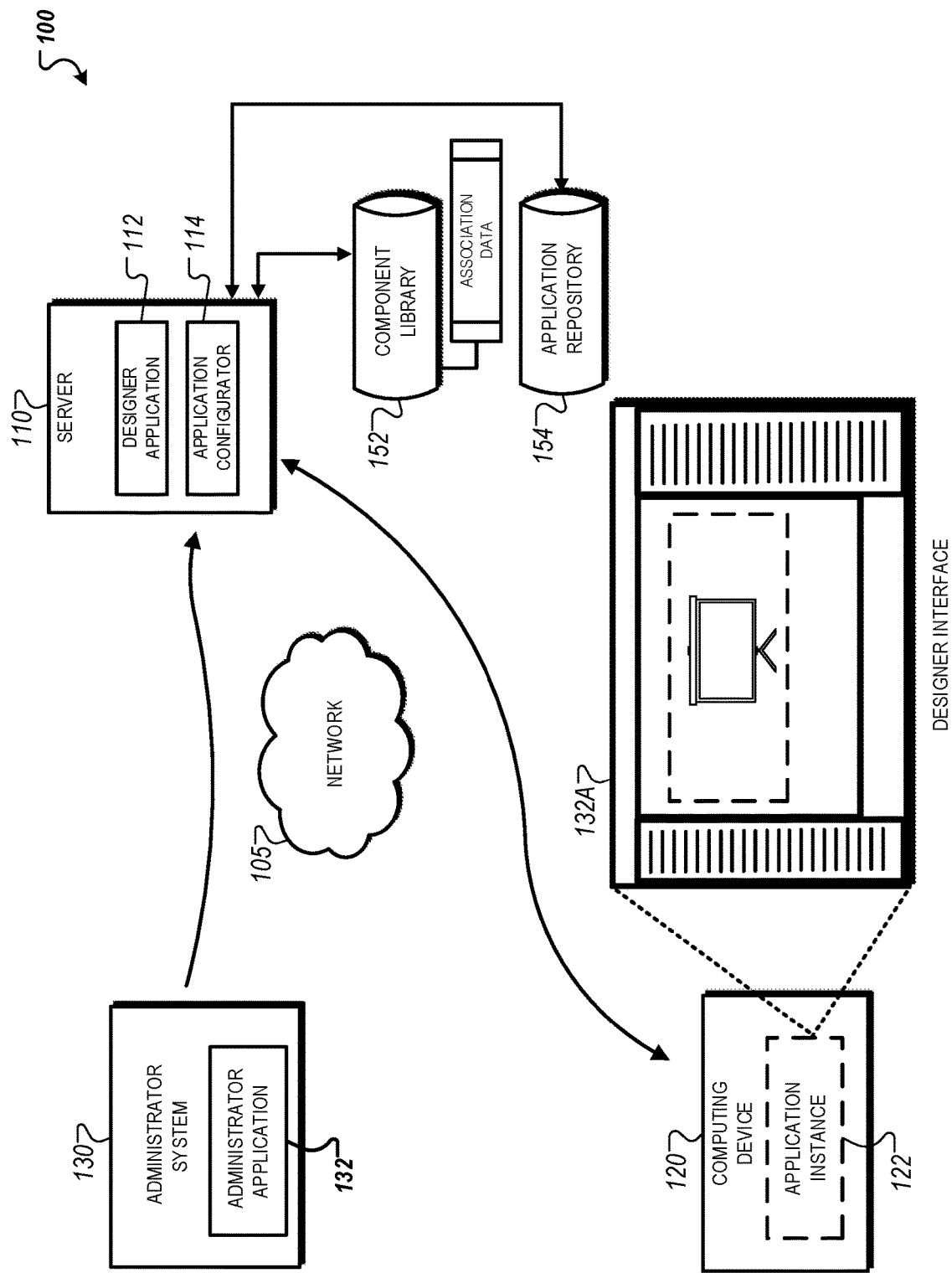

```
expenseReportForm
INTERFACE DEFINITION                                           🖫 ⟨/⟩ EXPRESSION MODE  ↶ ↷  SAVE TEST
⊞ ✎ ⌕ ⋈                                                        ● PREVIEW ○ PERFORMANCE
1  a!formLayout(
2    label:"Submit Expense Report",
3  ▶ contents:{
4  ▶   a!textField(
5        label:"Expense Item",
6        labelPosition:"ABOVE",
7        value: ri!expenseItem,
8        saveInto: ri!expenseItem,
9        refreshefter:"UNFOCUS",
10       required: true,
11       validations:{}
12     ),
13 ▶   a!dateField(
14       label:"Expense Date",
15       labelPosition:"ABOVE",
16       value: ri!expenseDate,
17       saveInto: ri!expenseDate,
18       required: true,
19       validations:{}
20     ),
21 ▶   a!floatingPointField(
22       label:"Expense Amount",
23       labelPosition:"ABOVE",
24       value: ri!expenseAmount,
25       saveInto: ri!expenseAmount,
26       refreshAfter:"UNFOCUS",
27       required: true,
28       validations:{}
29     ),
```

Submit Expense Report

Expense Item *

[                    ]

Expense Date *

[mm/dd/yyyy          ]

Expense Amount *

[101                 ]

Comments *

[                    ]

○ Approve
○ Reject

[CANCEL]                                    [SUBMIT]

INTELLIGENT MANIPULATION OF DYNAMIC DECLARATIVE INTERFACES

CROSS-REFERENCE TO RELATED APPLICATION

This application is a continuation of U.S. application Ser. No. 17/712,318, filed Apr. 4, 2022, now allowed, which is a continuation of U.S. application Ser. No. 16/393,764, filed Apr. 24, 2019, now U.S. Pat. No. 11,294,555, issued Apr. 5, 2022, which is incorporated by reference.

TECHNICAL FIELD

This specification generally relates to intelligent user interface design software.

BACKGROUND

Application development platforms (ADPs) commonly represent software that enables users to design, develop, and build software applications to execute certain functions. For example, enterprise ADPs allow users to build enterprise applications that perform functions relating to enterprise business operations, such as transaction report generation, collaborative capabilities, process automation, and event monitoring. Examples of applications include customer onboarding, dispute resolution, field inspections, employee management, and project management, among others.

Application software for electronic devices can provide useful functionality to users. For example, application programs can be designed to perform coordinated functions, tasks, or activities specified by a user or a collection of users. Applications are often associated with an application server within a software framework. For example, web-based mobile applications often display electronic content that is obtained from a web server that stores the electronic content. The server can operate similar to an extended virtual machine for running applications, handling connections to database, and connections to a web client. In other examples, an application provides services that are made available by the application server using computer hardware on which the services run.

SUMMARY

Some interface design applications (or designer applications) allow users to create, design, and develop customized user interfaces in software or computerized devices. For example, some designer applications provide various controls that allow a user to customize certain aspects of interface design, such as layout, formatting, presentation of visual elements, and actions/behaviors to be performed based on user interaction. While these designer applications are often used to develop interactive user interfaces (e.g., electronic forms), their own interfaces can often limit user interactivity during the design process. For example, some designer applications segment their use into "preview" and "develop" modes, which separates application functionality into two discrete experiences. While other designer applications may allow users to view end results of their designs during creation, many design functionalities are often limited during development due to complexities associated with building backend program code for an electronic form while a user designs the electronic form using a front-end user interface. Further to this point, because existing user interface design tools that allow non-programmers to design interfaces are focused on the visual aspects of interface design, as opposed to design of an application, they frequently do not provide the capability to bind user interface elements to a data source and/or add complex logical conditions to one or more user interface elements.

In addition, other interface designers fail to offer drag-and-drop interface design, which allows non-programmers to easily modify user interfaces by adding and moving components without having to do any coding, or that functionality is only provided in a design-only mode of the interface. Many designer applications are therefore not capable of providing a simple, streamlined way for users to design and test different configurations of electronic forms within a single interface.

The present disclosure describes systems and techniques that provide improvements to designer applications to address, for example, limitations associated with constructing a user interface as it is being designed by a user in a development environment. In some implementations, a system provides a design interface through which a user can view, develop, and test functional aspects of an electronic form in real-time while the user is building the application. The system maintains associations between components of the electronic form and expressions for the components referenced in program logic for the electronic form. The system also maintains associations between components of the electronic form and data stored in memory or on disk. A user can interact with the components while developing the electronic form, and the system can track these interactions, identify corresponding changes to the program logic, and incorporate the identified changes in real-time in a way that both preserves interactivity and the associations between the components and other components, data, and any program logic associated with affected components. For example, once a user adds a new component to an electronic form, the system can generate an expression to represent the newly added component, and then incorporate the expression into existing program logic for the electronic form. This process can occur in real-time so that the user can test the functionality of the newly added component through the same interface without having to switch between an editor interface and a testing interface, which is often the case for some designer applications.

The system can use association data between components and program logic to ensure that user interactions through a design interface are precisely represented as functional adjustments to program logic. For example, the system can maintain a set of attributes for a component of an electronic form (e.g., associated rules, required input, presentation features) and generate logical expressions representing values of the attributes within program logic used to construct an electronic form in a production environment. Manipulations to the component (e.g., adjustments to attributes) can be captured and translated to programmatic changes within expressions specified by the program logic. The translation can occur in an automated fashion (i.e., with minimal or no human intervention) so that a user need not have programming expertise in designing an electronic form. Moreover, the translation can occur in real-time (or near real-time) so that changes are represented instantaneously in a designer interface. Furthermore, the design interface creates expressions that allow a user to interact with the components in the same way they would in a production environment. In this way, the system allows a user to use a single interface to configure components of an electronic form, as test electronic form as they would appear and be used in a production environment.

Additionally, the designer application described herein can be hierarchically structured to enable persistence as a user designs and develops an electronic form. The system can use the hierarchical structure to ensure that an existing configuration of an interface element is maintained as the user performs other actions, such as adjusting the configurations of other components, or adjusting the interface element in other ways that do not impact its configuration (e.g., adjusting a location of a component in the electronic form without adjusting its configuration).

As an example, a user can create a component that displays a list of text options and a text box that can receive text input to add a new element to the list. The user can then use the text box to add a new element to the existing list of options so that the new element appears in the list of text options. Once the user has adjusted the list of text options (i.e., by adding the new element), the system modifies configuration data for the component to reflect the newly added element. This configuration can then be maintained even if, for example, the component is moved to a different part of the electronic form, or if the list of text options is modified in some other way. In this way, the designer application provides a more fluid, interactive, and seamless experience for designing and developing an electronic form.

In one aspect, a computer-implemented method can include a set of operations. The operations can include providing, by a computing device, a user interface for designing an electronic form for collecting or displaying data. The user interface includes a viewing panel that can display one or more components of the electronic form at one or more locations within the viewing panel. Each such component can be associated with a configuration specified in program logic for the electronic form. The method can also include the operation of receiving, by the computing device, a user input indicating an adjustment to the location of one or more components. Additionally, in response to receiving the user input indicating the adjustment to the location of a component, the method includes the operations of: adjusting the program logic for the electronic form to reflect the adjustment to the location of the component; retaining the association between the component and the configuration specified in program logic in the adjusted location of the component; and preserving functionality of the program logic for the electronic form. The method also includes the operation of generating a display of the electronic form based on the adjusted program logic which reflects the display of the component at the adjusted location indicated by the user input.

One or more implementations can include the following optional features. For example, in some implementations, the configuration indicates values for a list of attributes assigned to the component.

In some implementations, the user input indicating the adjustment to the location of the component specifies a second location within the viewing panel to place the component. Additionally, adjusting the program logic for the electronic form to reflect the adjustment to the location of the component includes: adjusting a first portion of the program logic specifying a present location of the component within the viewing panel such that the present location corresponds to the second location; and maintaining a second portion of the program logic specifying the values for the list of attributes indicated by the configuration such that the second portion of the program logic specifies the same values when the component is placed in the second location within the viewing panel.

In some implementations, the method further includes the operation of receiving, by the computing device, a second user input indicating an adjustment to the configuration of the component. Additionally, in response to receiving the second user input indicating the adjustment to the configuration of the component, the method includes the operations of: generating, by the computing device, a second configuration for the component based on the adjustment to the second user input, generating, by the computing device, new program logic for the electronic form to reflect the second configuration, and storing, by the computing device, data representing the new program logic such that the component remains associated with the second configuration when the component is moved to a different location within the viewing panel.

In some implementations, the user interface further includes a component panel that displays a list of components. Additionally, the component is selected from among the list of components and introduced into the viewing panel.

In some implementations, the user interface further includes a component configuration panel that displays a set of attributes assigned to components included in the list of components. Additionally, the configuration for the component specifies values for a particular set of attributes that are assigned to the component.

In another general aspect, a computer-implemented method includes the operations of: providing, by a computing device, a user interface for designing an electronic form for collecting data. The user interface includes a viewing panel configured to display one or more components selected for the electronic form; receiving, by the computing device, a user input that indicates (i) a selection of a component, and (ii) insertion of the component into the viewing panel. Additionally, in response to receiving the user input that indicates the selection of the component and insertion of the component into the viewing panel, the method includes the operations of: determining a configuration for the component, and generating, by the computing device, program logic for the electronic form based at least on the configuration for the component.

In some implementations, the configuration for the component indicates values for a list of attributes assigned to the component. Additionally, the program logic for the electronic form includes a logical expression specifying values for the list of attributes assigned to the component.

In some implementations, the program logic is generated by the computing device in real-time in response to receiving the user input that indicates the selection of the component and insertion of the component into the viewing panel.

In some implementations, the user interface further includes: a component panel that displays a list of components available for inclusion in the electronic form; and a component configuration panel that displays a set of attributes that are assigned to each component included in the list of components.

In some implementations, the list of components includes one or more components having different classifications.

In some implementations, the list of components includes: a first component that is classified as a layout component; a second component that is classified as an input component; and a third component that is classified as a selection component.

In some implementations, the method further includes the operations of: generating, by the computing device, the electronic form based on the program logic; and providing, by the computing device, a display of the generated electronic form for output through the user interface.

In some implementations, the electronic form is generated in real-time in response to receiving the user input that indicates the selection of the component and insertion of the component into the viewing panel.

In some implementations, the generated electronic form permits a user to input data in the component through the user interface.

In some implementations, the method further includes the operation of receiving, by the computing device, a second user input indicating an adjustment to the configuration of the component. Additionally, in response to receiving the second user input indicating the adjustment to the configuration of the component, the method further includes the operations of: generating, by the computing device, a second configuration for the component based on the adjustment to the second user input, generating, by the computing device, new program logic for the electronic form to reflect the second configuration, and storing, by the computing device, data representing the new program logic such that the component remains associated with the second configuration when the component is moved to a different location within the viewing panel.

In another general aspect, a computer-implemented method includes providing, by a computing device, a user interface for designing an electronic form for collecting or displaying data. The user interface includes a viewing panel that displays a component of the electronic form in a location within the viewing panel, and the component is associated with a configuration specified in program logic for the electronic form, including a program logic defining the component and a program logic external to or otherwise non-adjacent to the program logic defining the component. The external or non-adjacent program logic affects the display or behavior of the component. The method also includes the operation of receiving, by the computing device, a user input indicating an adjustment to the location of the component. Additionally, in response to receiving the user input indicating the adjustment to the location of the component, the method includes the operations of: adjusting the program logic for the electronic form to reflect the adjustment to the location of the component; retaining the association between the component and the configuration specified in program logic in the new location of the component; preserving the functionality of the program logic for the electronic form; and generating a display of the electronic form based on the adjusted program logic which reflects the display of the component at the adjusted location indicated by the user input.

In another general aspect, a computer-implemented method includes providing, by a computing device, a user interface for designing an electronic form for collecting or displaying data. The user interface includes a viewing panel that displays a component of the electronic form in a location within the viewing panel, and the component is associated with a configuration specified in program logic for the electronic form. The method also includes receiving, by the computing device, a user input indicating an adjustment to the location of the component. Additionally, in response to receiving the user input indicating the adjustment to the location of the component, the method includes the operation of determining if the adjusted location of the component indicated by the user input is a valid location for the component. Moreover, based on this determination, the method further includes the operations of: adjusting the program logic for the electronic form to reflect the adjustment to the location of the component; retaining the association between the component and the configuration specified in program logic in the new location of the component; preserving the functionality of the program logic for the electronic form; and generating a display of the electronic form based on the adjusted program logic which reflects the display of the component at the adjusted location indicated by the user input.

In another general aspect, a computer-implemented method includes providing, by a computing device, a user interface for designing an electronic form for collecting or displaying data. The user interface includes a viewing panel that displays a component of the electronic form in a location within the viewing panel, and the component is associated with a configuration specified in program logic for the electronic form. The method also includes receiving, by the computing device, a user input indicating an adjustment to the location of the component. Additionally, in response to receiving the user input indicating the adjustment to the location of the component, the computing device, the method includes the operations of: determining the component is of a type that requires a container component; and determining the adjusted location of the component indicated by the user input is not inside a container component. Moreover, based on determining the component is of a type that requires a container component and determining the adjusted location of the component indicated by the user input is not inside a container component, the method further includes: creating a container component at the adjusted location indicated by the user input; adjusting the program logic for the electronic form to reflect the adjustment to the location of the component; retaining the association between the component and the configuration specified in program logic in the new location of the component; preserving the functionality of the program logic for the electronic form; and generating a display of the electronic form based on the adjusted program logic which reflects the display of the component at the adjusted location indicated by the user input.

In another general aspect, a computer-implemented method includes providing, by a computing device, a user interface for designing an electronic form for collecting or displaying data. The user interface includes a viewing panel that displays a component of the electronic form located within a container component in a location within the viewing panel, the container component is associated with a configuration specified in program logic for the electronic form, and the component is associated with a configuration specified in program logic for the electronic form. The method also includes receiving, by the computing device, a user input indicating an adjustment to the location of the component. Additionally, in response to receiving the user input indicating the adjustment to the location of the component, the method further includes determining the component is the only component within the container component. Moreover, based on determining the component is the only component within the container component, the method further includes: adjusting the program logic for the electronic form to reflect the adjustment to the location of the container component and the component within the container component; retaining the association between the container component and the configuration specified in program logic in the new location of the container component; retaining the association between the component and the configuration specified in program logic in the new location of the component; preserving the functionality of the program logic for the electronic form; and generating a display of the electronic form based on the adjusted program logic which reflects the display of the container component and the component within it at the adjusted location indicated by the user input.

In another general aspect, a computer-implemented method includes providing, by a computing device, a user interface for designing an electronic form for collecting or displaying data. The user interface includes a viewing panel that displays a component of the electronic form in a location within the viewing panel, and the component is associated with a configuration specified in program logic for the electronic form, and the configuration includes a logical expression that is external to program logic defining the component, the logical expression applying to the component so as to affect its display or behavior. The method also includes receiving, by the computing device, a user input indicating an adjustment to the location of the component. Additionally, in response to receiving the user input indicating the adjustment to the location of the component, the method further includes: adjusting, by the computing device, the program logic for the electronic form to reflect the adjustment to the location of the component, adjusting, by the computing device, the program logic so the logical expression that is external to the program logic continues to apply to the component so as to affect its display or behavior, and generating a display of the electronic form based on the adjusted program logic which reflects the display of the component at the adjusted location indicated by the user input.

One or more implementations discussed above can include the following optional features. For example, in some implementations, the component permits a user to input data in the component through the user interface.

In some implementations, prior to receiving the user input indicating an adjustment to the location of the component, the method further includes the user entering data into the component through the user interface.

In some implementations, the method further includes displaying the data entered by the user into the component through the user interface in the component at the adjusted location.

In some implementations, the display of the electronic form is generated in real-time.

Other versions include corresponding systems, and computer programs, configured to perform the actions of the methods encoded on computer storage devices.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

FIGS. 1A-B illustrate examples of a system associated with an ADP through which a designer application can be accessed.

FIG. 5 illustrates an example of an expression mode interface of a designer application.

FIG. 7 illustrates an example of a nested interface element that can be configured through the designer application.

In the drawings, like reference numbers represent corresponding parts throughout.

DETAILED DESCRIPTION

Figure 1A:
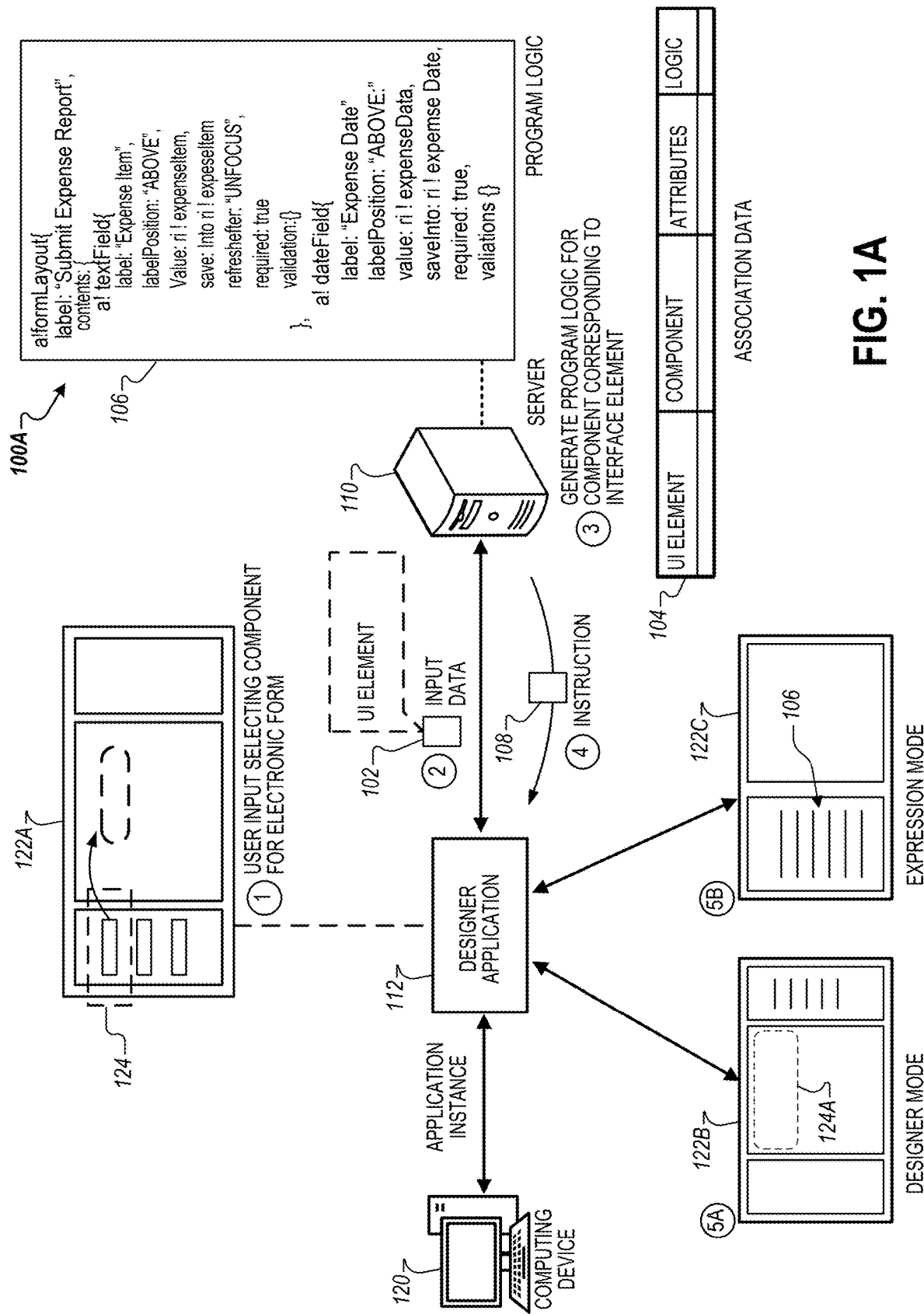

The present disclosure describes systems and techniques that provide improvements to designer applications to address, for example, limitations associated with constructing an electronic form for collecting data as it is being designed by a user in a development environment. In some implementations, a system provides a design interface through which a user can view, develop, and test functional aspects of an electronic form in real-time while the user is building the application. The system maintains associations between components of the electronic form, expressions for the components referenced in program logic for the electronic form, and data populated in the components. A user can interact with the components while developing the electronic form, and the system can track these interactions, identify corresponding changes to the program logic, and incorporate the identified changes in real-time in a way that does not break interactivity or alter component associations or populated data.

As discussed herein, a "function" refers to an operation or a command that is executed by a computing device to perform some specified task defined by the function. For example, a "delete( )" function within a word processor can refer to erasure of a typed word within a document. The requirements of a function are defined by an expression that specifies, for example, elements associated with the function. For example, a function can be defined based on properties of inputs and outputs, requirements for outputs, or criteria for executing tasks specified in the expression.

As discussed herein, an "application" refers to a collection of objects that corresponds to a network-based application that accepts data input from the user and provides visual feedback to the user, such as a business solution. Objects can include components like user interface elements (e.g., interface elements displayed on an electronic form), computational units, processes, reports, and additional objects that have defined relationships and can be associated with data sources. Relationships between objects are defined in code to represent program logic for an application. An application can be developed and configured through an ADP to represent a collection of interfaces, processes, rules, and data objects that work together to execute associated operations. For example, an enterprise application can be executed to provide a business functionality, such as creating a transaction report.

Users can build and configure applications through interfaces enabled by the ADP. For example, users can use the interfaces to build applications by specifying relationships between visual development tools that correspond to the programming logic for source code of an application. As an example, the visual development tools can include a drag-and-drop modeler that allows users to build dependencies between user interface elements that visually represents components of an application. For instance, the user interface elements can represent functions to be executed in relation to a business process managed by the application, the dependencies can represent an order in which functions are performed to execute the overall business process. In another example, the visual development tools can include point-and-click creation tools that allow users to combine user interface elements representing functions to specify a task to be performed. For instance, the user can build an application that manages orders by creating electronic forms for entering and updating order details and reports for tracking orders. The user can create a form for entering and updating order details by pointing to and dragging user interface components, such as text fields, onto an electronic form to allow the input of information like customer name, product name, product category, and SKU.

As described herein, an "electronic form" represents an interface of an application through which information is received. An electronic form can be designed and constructed from components and corresponding configurations through an designer application that itself is accessible through the ADP. For example, an electronic form can be designed visually, by dragging and dropping components, or programmatically, by generating components via expressions. Regardless of the method used for designing the electronic form, the entire electronic form can be represented as a single expression in program logic, which is the combination of the expressions making up each component of the electronic form.

As described herein, a "report" represents an interface of an application through which data existing within the application is displayed to the user in summary and/or detailed fashion. Like an electronic form, a report can be designed and construction from components and corresponding configurations using an designer application that is accessible through the ADP. For example, a report can be designed visually, by dragging and dropping components, or programmatically, by generating those components using expressions. Regardless of the method used for designing the report, the entire report can be represented as a single expression in program logic, which is the combination of the expressions making up each component of the report.

As described herein, a "component" is a building block used to construct an electronic form. Different types of components can be assembled, and individually configured, to design an electronic form that can be included in an application. As examples, layout components, or "container components," provide structural arrangements of in the electronic form, input components allow entry of input data in the electronic form, selection components provide sets of choices from which one or more selections can be made, display components provide visual representations of information on the electronic form, and grid components present data, images, and links in a tabular format. Other examples of components are discussed in detail below.

As described herein, an "interface element" refers to a visual representation of a component through the designer application. A user can interact with interface elements when designing or constructing an electronic form by, for instance, inserting a new component into an electronic form, arranging multiple components relative to one another, or manipulating attributes associated with components. As discussed in detail below, an interface element for a corresponding component can be programmatically configured within program logic for an electronic form. In addition, the attributes of a component can be set in a visual interface of the ADP. The ADP generates association data correlating the aspects of the visual display of an interface element with the program logic of that element, including all of its attributes, to automatically generate expressions of program logic for the electronic form without requiring a user to manually develop code. In this way, the association data between interface elements and components increases the ease-of-use in designing, constructing, and configuring an electronic form without requiring a user to have significant software engineering expertise.

As discussed herein, an "expression" refers to a string of characters in a programming language (or scripting language) that define a function and are intended to return a value and/or perform a specified action. For example, an expression can represent a combination of elements, such as one or more explicit values, constants, variables, operators, and/or functions that the programming language interprets and computes to produce (or return in a "stateful" environment) another value. Evaluation of an expression refers to the interpretation and computation of the expression by the programming language to return the intended value. For example, an expression "2+3" defines a function "add( )" and is evaluated to produce an output with the value "5," which represents the output of the "add( )" function. Expressions can also be used to define the configuration of a component that can be used in an electronic form. This configuration can be specified in a definition of the component in program logic, and can be used to specify information such as values for various attributes associated with aspects of the display of the component, e.g., a text label, and variables used to bind the component to a data source. In addition, program logic external to the definition of the component can be used to specify the configuration of a component, for instance using programmatic operations that are evaluated to relate some aspect of the component's display to other information and logical conditions evaluated to determine whether and/or how to display the component. The expressions representing several individual components can be combined so that an entire electronic form in an ADP can be described in program logic using a single expression.

As described herein, information collected in "real-time" refers to information that is collected and/or processed instantaneously with minimal delay after the occurrence of a specified event, condition, or trigger. For instance, inputs provided by a user in relation to designing an electronic from through a designer application can be processed such that such that program logic used to construct the electronic form is generated with minimal delay. This allows a user to use the designer application to adjust aspects of an electronic form and immediately, or substantially immediately, view the impacts of the adjustments on the structure, presentation, and/or performance of components of the electronic form. The minimal delay in collecting and processing user input data received through the designer application can be based on a sampling rate of an input processor that senses user interactions through the designer application, and a time delay associated with processing collected user input data, generating configurations for components, and adjusting program logic to reflect the generated configurations.

As described herein, "live view" refers to a view of the electronic form in the designer application that appears and functions exactly as it will in the production environment. For instance, when a user inputs data into a component that is bound to a data source in the electronic form and submits the form, the interface will save the data to the underlying data source. As another example, when the user passes data into the electronic form's variables from a data source, the electronic form will display data from the data source. As yet another example, if the user specifies conditional logic that causes one set of components to be displayed if the condition is true and another set of components to be displayed if the condition is false, the electronic form will adjust the set of components that are displayed when the condition's truthfulness changes. By way of further explanation of this example, the condition of the conditional logic could be true if a user were to select one radio button, in a group of radio buttons, or false if the user were to select a different radio button in that group. Alternatively, the condition of the conditional logic could be true if the user were to click on one button and false if the user were to click on another button. As another alternative, the condition of the conditional logic could be true if the user were to select one item from a drop down list or false if the user were to select another item from a drop down list. The examples given should not be understood to be limiting as to how the conditional logic might be used to affect the display of a component.

FIGS. 1A-1B illustrate examples of a system associated with an ADP. Referring initially to FIG. 1A, an example of a process 100A for providing an designer application 112 to design an electronic form is depicted. A user associated with a computing device 120 accesses designer interfaces provided through the application 112 to design and construct and an electronic form. The user initially selects an interface element 124 to be added as a component to the electronic form. An associated server 110 captures the user's interactions with the application 112, generates a configuration for a component corresponding to the interface element 124, and maintains program logic 106 for the electronic form based on the component configuration. As discussed below, the server 110 can dynamically maintain the program logic 106 while the user interacts with the application 112 so that any adjustments to the configuration of the component can be incorporated into the program logic 106 in real-time. In this way, the application 112 enables a user to use a single interface (e.g., interface 122A) simultaneously develop and test an electronic form, and to interact with the form exactly as the user would in a production environment.

The process 100A proceeds in a set of stages as shown in FIG. 1A. At stage (1), the computing device 120 accesses an instance of the application 112 to develop an electronic form. In some instances, the application 112 is a web-based application accessed by the computing device 120 through a webpage presented on a browser application. In such instances, the computing device 120 accesses an instance of the application 112 once the user logs into the web-based application. In other instances, the application 112 is accessed virtually through a native application (e.g., a thin-client application) installed on the computing device 120, but executed locally on the server 110. In such instances, the computing device 120 accesses an instance of the application 112 once the native application is executed on the computing device 120 and establishes communications with the server 110.

At stage (2), the server 110 receives user input data 102 representing the user's interactions with the application 112. For example, the user input data 102 can include a "drag-and-drop" input, which indicates that the user has selected the interface element 124 and moved it to an area of the interface 124 that provides a live view of the electronic form. This indicates that the user has opted to introduce a new component into the electronic form.

At stage (3), the server 110 generates program logic 106 to logically represent the user's interactions with the application 112. For example, the server 110 uses association data 104 to identify a component corresponding to the interface element 124. The component is associated with a configuration that is a programmatic representation of its functionality. For example, a text box component that receives text input is associated with a configuration that defines the types of characters that are permitted as input, dimensions of the text box, display size of text within the text box, among others.

The association data 104 maps interface elements presented on the application 112 to corresponding components that are incorporated into program logic for representing attributes and functions associated with the interface elements. For example, the association data 104 can be a table that identifies one or more components corresponding to a user element, attributes of the components, and logical expressions representing functionality imparted. The server 110 uses the information specified in the association data 104 determine how to configure a component to represent functionality specified by user input. In this way, a user with limited technical expertise (e.g., a business user) can use the application 112 to develop sophisticated electronic forms without having significant programming expertise.

At stage (4), the server 110 generates an instruction 108 that is transmitted to the computing device 120. The instruction 108 is generated based on program logic configured for the component corresponding to the interface element 124. For example, the instruction 108 can cause the application 112 to update a display presented on the computing device 120 from the interface 122A to interface 122B. The transition between interfaces 122A and 122B causes a component 124A to be displayed in a panel of the application 112 that allows a user to view the electronic form being developed.

At stage (5), the application 112 is configured based on the instruction 108 received from the server 110. The precise configuration can be dependent on the mode in which the application 112 is currently operating when the instruction 108 is received. For example, in some instances, the application 112 operates in a "design" mode where the application 112 acts as a "what you see is what you get" (WYSIWYG) editor that allows a user to view an end result of the electronic form while the electronic form is being developed by the user (e.g., while interface elements are added to a form layout). In such instances, the instruction 108 causes the interface 122A to be adjusted so that interface 122B is then displayed on the computing device 120.

As shown in FIG. 1A, the interface 122B displays a component 124A in response to the user input on the interface 122A (e.g., dragging and dropping the interface element 124 onto a viewing panel). The component 124A enables a user to visualize how an electronic form is to be formatted and displayed when implemented in a production environment. The user can manipulate the component 124A further, for example, by changing its location in the electronic form, configuring conditional rules designating when the component 124A is displayed, or adjusting formatting or layout attributes within the electronic form. The server 110 can process these adjustments in a similar manner as discussed above to reconfigure program logic generated for the electronic form.

In other instances, the application 112 operates in an "expression" mode where the application 112 provides a text editor that includes the program logic 106 generated by the server 110 for the electronic form. In this mode, the user can modify expressions specified by the program logic 106 to customize aspects of the electronic form using code (in contrast to adjusting the display of the electronic form in the "design" mode of the application 112). In such instances, instruction 108 causes the interface 122C to be displayed on the computing device 120 so that the user can view, access, or modify the program logic 106.

As described throughout, the process 100A enables the user to use the application 112 to design electronic forms in ways that provide various technical advantages over other designer applications or programs. For example, in the "design" mode of operation, the application 112 allows a user to simultaneously develop an electronic form and test components of the electronic form as the electronic form is being developed. Because the program logic 106 is dynamically generated by the server 110 as the user interacts with the application 112, any adjustments can be processed in real-time to enable components to function as they would when the electronic form is fully generated. The server 110 can also translate user-specified adjustments to a component in real-time to adjustments for a corresponding expression specified in the program logic 106 for the component. This enables an user to perceive the adjustments visually (e.g., through an updated display of the electronic form) without requiring the user to change a mode of operation of the application 112 and/or access other interfaces, which tend to complicate the development process.

As another example, because the application 112 provides access to both visual elements of an electronic form being developed (e.g., component 122A) and backend program logic underlying the configuration of the electronic form (e.g., program logic 106), a user has a greater flexibility to design an electronic form without having to understand programming language used to construct the electronic form. As discussed in detail below, the application 112 includes multiple tabs that allow a user to seamlessly switch between a "design" mode and a "expression" mode, allowing quick and efficient access to both front-end and back-end aspects involved in designing an electronic form.

Referring now to FIG. 1B, an example of an ADP 100, through which the application 112 can be provided, is depicted. The ADP 100 includes a server 110, and a computing device system 120, and an administrator system 130, which all exchange data communications over a network 105. The server 110 includes a designer application 112 and an application configurator 114. The server 110 also stores a component library 152, association data related to components within the component library 152, and an application repository 154. The computing device 120 is configured to execute an application instance 122 of the application 112 executed on the server 110 (e.g., through webpages accessed through a browser application, or through a thin-client native application that accesses resources hosted on the server 110), through which a user can design and develop an electronic form associated with the ADP 100. The administrator system 130 can be used by a platform provider to configure various aspects and/or operations performed by the server 110 and/or other processes relating to the ADP 100 overall.

The ADP 100 can be configured to address various technological limitations of many other application development platforms that are typically employed in business environments. For example, applications of such platforms that are deployed in business environments are often designed, configured and implemented by individuals with technical expertise (e.g., software developers, information technology (IT) administrators, etc.). Applications configured to be designed by non-technical users (e.g., business end-users) often either provide a limited set of customization features, or provide customization features that can potentially create system-wide vulnerabilities. For example, if an application is incorrectly designed and/or implemented, then its execution in a production environment can potentially cause performance-related issues (e.g., inefficient resource allocation, breaking or removing critical application dependencies). Many application development platforms reduce the impact of such vulnerabilities by limiting the privileges of users and/or limiting the functioning the functional capabilities for applications that are designed and/or customized by end-users.

The ADP 100 addresses these and other limitations by providing a cloud-based environment that allows users with limited technical expertise to develop applications without the need to create, deploy, and maintain the technical infrastructure for developing applications on their own (e.g., program logic used to construct electronic forms for applications). For example, the ADP 100 can be configured to outsource administration of the underlying technical infrastructure and security to a platform provider, such as an entity that manages, or is otherwise associated with, the administrator system 130. As described in reference to FIG. 1A, ADP 100 can also provide user interfaces that enable seamless development of electronic forms to be used in web-based applications (e.g., business process applications).

Applications developed and provided through the ADP 100 can be configured through visual interfaces of a designer application (e.g., the application 112) so that a user designing the application can create, modify, or manipulate relationships between associated objects without having to understand code or program logic needed to create electronic forms for the application. Additionally, relationships between groups of interface elements presented through the designer application can be defined using models that define steps in a business process. For example, a business process related to the reporting of a weekly report can be defined in a model by the data included in the weekly report, and data sources from which the data is to be extracted.

Data obtained from data sources in association with an application can be stored into a record. As described herein, a "record" refers to a definition of different types of data that are associated with a particular business object, such as a customer. A record can pull data from one or more data stores, as well as generate it from processes performed within an application. The ADP 100 can be used to manage business processes, such as collecting data on, reporting on, and tracking responses to business cases (e.g., case management), customer interactions (e.g., customer relationship management), tracking inventory, among others.

As described throughout, the ADP 100 provides a designer application that can be used for building applications. The designer application allows a user to start with a blank canvas of an electronic form and then interact with different interface elements to design a user interface. For example, a user can drag and drop user interface elements onto an area of a designer interface that is configured to display a live view of the electronic form. A draft electronic form within a designer interface can be manipulated through the use of various interface elements in panels of the designer interface. The designer interface also includes a pane that displays code corresponding to the program logic used to generate the electronic form once developed, which provides users with coding experience with additional customization options.

The components of the ADP 100 are now described in greater detail. The ADP can be a software platform that allows users, e.g., users of the computing device 120, to design, develop, and deploy applications. The ADP 100 may be configured as a low-code application development platform that allows users to build applications without actually coding functions. For example, the ADP can allow users to configure applications through the designer application 112 for executing certain tasks. In this regard, a user can use the ADP 100 to build an application using a visual design interface and/or a simplified text editor without significant programming knowledge and/or skills. Examples of applications that can be built using the ADP are discussed below.

The administrator system 130 can be used by a developer associated with a platform provider (e.g., a software developer, IT administrator) to develop and/or manage software functions relating to the ADP 100. For example, the developer application can be an integrated development environment (IDE) that enables a developer to create, modify, and test software upgrades to the ADP. The developer application can be used to provide different software environments, such as a test environment, a deployment environment, and a production environment, to design and test features of the ADP 100. Specifically, developer application can allow code, data, and configuration associated with a new release version of the ADP 100 to be tested in a pre-production environment for testing prior to deployment to the server 110.

The server 110 can include one or more computing devices that run software and/or host services that support the ADP 100. For example, the server 110 can include data centers that store application data associated with applications that are developed through the ADP 100, web servers that host a web-based application through which users can access the ADP 100, and/or application servers that allow a native application running on the computing device 120 to access the ADP 100 through an application package interface (API).

The server 110 includes hardware and software components that support various functions associated with the ADP 100, such as creation of applications, testing of applications, execution of applications, updates to the technical architecture of the ADP 100, upgrades to functionalities provided through the ADP 100, among others. For example, in the context of designing electronic forms for applications provided through the ADP 100, the server 110 can execute resources associated with the application 112, and then provide access to the resources to the computing device 120 (e.g., through the application instance 122). The server 110 can also execute an application configurator 114 which can perform processes relating to an electronic form designed through the application 112, such as generating program logic for the electronic form, processing adjustments to the program logic based on user input through designer interfaces, and compiling the program code within an application in which the electronic form is to be used.

The server 110 stores data used to support processes relating to designing electronic forms through the application 112. For example, the server 110 stores a component library 152 that includes a set of components that are capable of being used to design an electronic form. Examples of components include different types of fields that can be included in the electronic form (e.g., layout, input, selection, chart, etc.). Components included in the component library 152 can be associated with interface elements displayed on designer interfaces of the application 112. The server 110 utilizes association data between components and corresponding interface elements to inter-relate user input in designing an electronic form and program logic implemented to construct the electronic form.

The server 110 also stores an application repository 154 identifying a list of applications that have been developed and/or are accessible through the ADP 100. The application repository 154 specifies various types of information for each application, such as associated business rules, execution parameters, dependencies to other applications, application classifications, among others. An electronic form designed using the application 112 is associated with one or more applications included in the application repository 154 so that once the electronic form has been designed, data identifying the electronic form is associated with one or more corresponding applications in the application repository 154.

The computing device 120 can be any type of processing device used to access applications provided through the ADP 100. As examples, the computing device 120 can be a laptop computing device, a desktop computing device, a tablet computing device, a smartphone, a mobile phone, a wearable device, or any other type of network-enabled device that includes a screen, e.g., a liquid crystal display (LCD) screen, to display user interfaces of the ADP. The computing device 120 can be configured to receive input from users using input devices, e.g., touch screens, touch pads, mice, keyboards, etc., to interact with interfaces of the ADP presented for output on the display of the computing device 120.

The computing device 120 runs an application instance 122 to access the application 112 running on the server 110. During the application instance 122, a user can access resources hosted the server 110 to design electronic forms using features, toolkits, design templates, and components of the ADP 100. Specifically, as shown in FIG. 1A, the user can access designer interfaces (e.g., interfaces 122A-C) to visually and/or programmatically design an electronic form. For example, a design mode interface provides a WYSIWYG editor that allows a user to view an end result of the electronic form while the electronic form is created. As another example, an expression mode interface provides a text editor that includes program logic generated by the server 110 for the electronic form as it is being created. The user can edit the electronic form using the WYSIWYG editor or the expression mode interface.

The application instance 122 can be configured to provide access to data objects, smart services, flow control, scripts, functions, and other elements associated with the ADP 100 without requiring the user to have significant programming knowledge or software development expertise. For example, a user can access user interfaces displayed during the application instance 122 to define a business process for an application by using a drag-and-drop process modeler to specify relationships between data objects without having to understand programming language used to define functions of the application.

Figure 2:
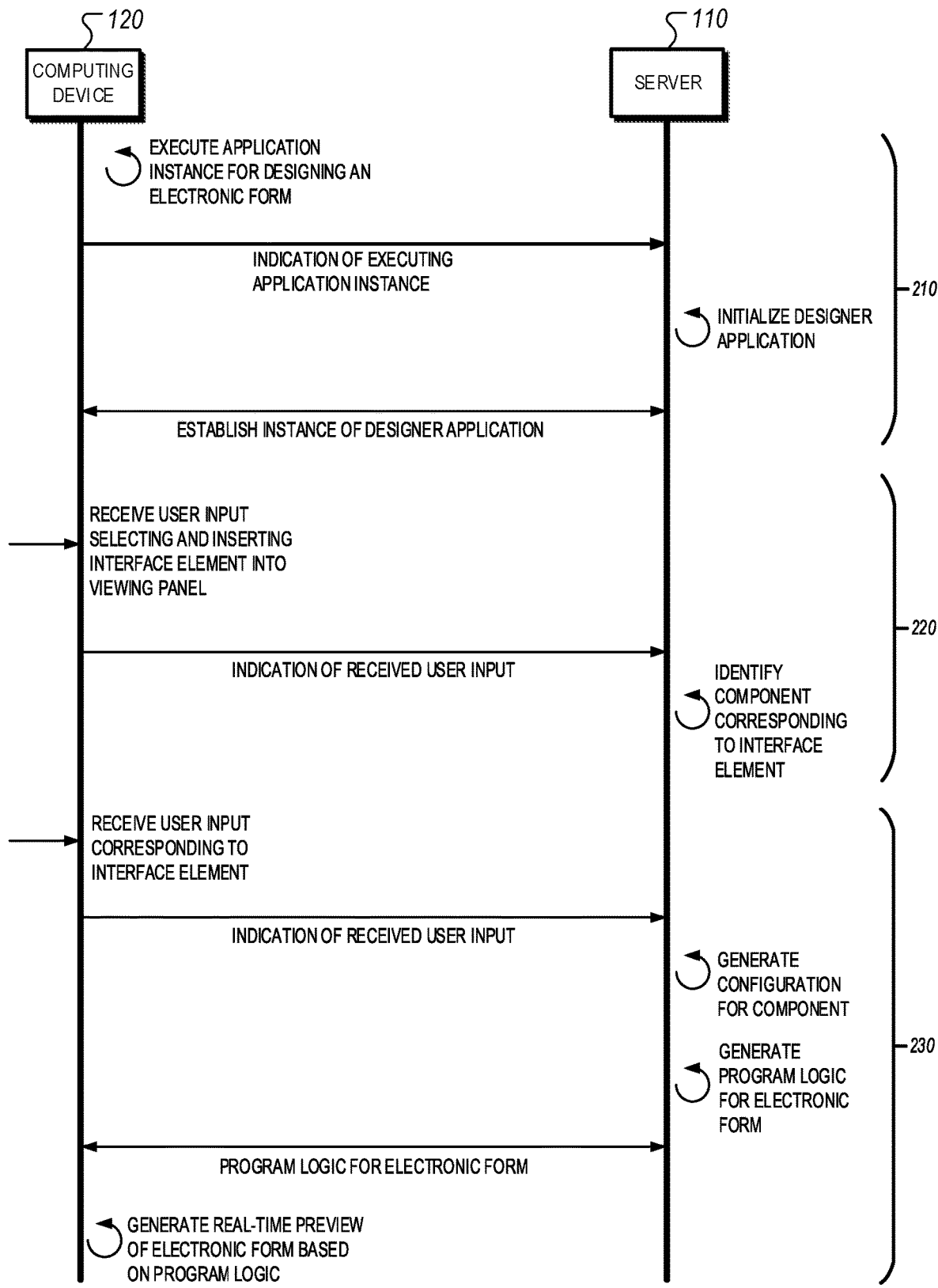
FIG. 2 illustrates an example of a process for dynamically configuring an electronic form through a designer application.

FIG. 2 illustrates an example of a process 200 for dynamically configuring an electronic form using an application. The process 200 involves sets of operations that enable the computing device 120 to establish communications with the server 110 during an application instance where a user can access designer interfaces to visually design an electronic form.

At 210, the computing device 120 establishes network communications with the server 110 and executes an application instance through the network communications. The computing device 120 initially executes an instance of the application 112 through, for example, a webpage associated with the server 110 or a native application that is configured to access resources hosted by the server 110. The computing device 120 provides an indication that the instance has been accessed on the computing device 120, which causes the server 110 to initialize the application 112 that runs locally on the server 110.

At 220, the computing device 120 monitors user interaction with a designer interface during the application instance 122. For instance, the computing device 120 can receive a drag-and-drop input that selects an interface element and places the selected interface element onto a viewing panel of a designer interface. Input data received on the computing device 120 is relayed to the server 110 and used to identify a component that corresponds to the selected interface element. As an example, the input data can indicate a selection of a user element corresponding to a text box to be added to an electronic form. The user can indicate selection of the component by, for instance, clicking on the text box component and holding down the mouse button. The user can then add the component to the electronic form by, while holding down the mouse button, dragging the pointer to the location on the electronic form where the component should appear and releasing the mouse button. The server 110 then uses the user's input data, including the selection of a component and adding the component to an electronic form, to identify a text box component within the component library 152 and associated data, such as attributes, layout, and associated business rules.

At 230, user input related to the selected interface element is monitored to generate program logic for the electronic form being designed. The computing device 120 receives user input that updates (e.g., configures, modifies, or manipulates) an interface element that has been inserted into a viewing panel of the application 112. For example, the user input can be a dragging motion that changes a location of the interface element in the electronic form relative to other elements of the electronic form, or changes the nesting of the interface element within a container even if the location of the interface element is not changed. Another example of a user input is a change to or setting of an attribute of the interface element (e.g., color, font, etc.). In another example, a user input constitutes specifying a variable that stores data that will be displayed, modified or unmodified, within the interface element. In some other examples, the user input adjusts behaviors relating to the display of the interface element in the electronic form (e.g., conditional presentation of the interface element, displaying pop-up notifications based on detecting certain user interactions, etc.).

The server 110 receives user input data from the computing device 120 and generates a configuration for the interface element based on user inputs related to the interface element, such as the aforementioned changing or setting of attributes, specifying variables whose data is displayed, and adjustment to behaviors. For example, in certain instances where the user input adjusts a location of the interface element in the electronic form, the server 110 generates a configuration that modifies a coordinate location of a reference point of the interface element based on the location adjustment. As another example, if the user input modifies an attribute value for the interface element, then the server 110 updates attribute data specified by a present configuration of the interface element such that the updated attribute data includes the modified attribute value specified by the user input. In some instances, where the user input creates an association or dependency with another interface element of the electronic form, the server 110 creates relationships between corresponding components to reflect the association or dependency. For example, if the user input data inserts a text box element into a layout element that organizes other elements, then the server 110 can update a hierarchical framework of the text box element to include the text box element. In some other instances, when the user input creates a condition that affects the display of an interface element, the server 110 creates a logical condition, such as an if statement, or other operation, that exists in program logic that surrounds the program logic that defines the interface element and its attributes. Because this program logic external to the interface element affects the display of the interface element, it can be considered part of its configuration.

Upon generating the configuration for the interface element, the server 110 updates program logic for the electronic form to implement the update specified by the input data received from the computing device 120. The updated program logic can represent a modified expression code for generating the electronic form. As described throughout, the update to the program logic can be processed automatically by the server 110 (i.e., with minimal or no human intervention) so that the user designing the electronic form through the application 112 need not understand semantics of the program logic. In the example discussed above, where a text box element is inserted into a layout element that organizes other elements, the server 110 modifies program logic so that an expression corresponding to the text box element is updated to reference a nested object (e.g., the text box element). The server 110 performs this modification using pre-configured configuration rules that associate user inputs to specified changes to program logic for an electronic form so that the user need not manually perform the update.

The server 110 transmits an instruction referencing the updated program logic for the electronic form to the computing device 120. Upon receipt, the instruction causes the computing device 120 to adjust the application instance 122 so that the updated program logic is accessible. For example, in some instances where the application instance 122 is accessed through a webpage, the instruction causes a browser application to reload the webpage. In other instances, where the application instance 122 is accessed through a native application, the instruction causes the native application to obtain adjusted configuration data associated with the application 112.

Figure 4:
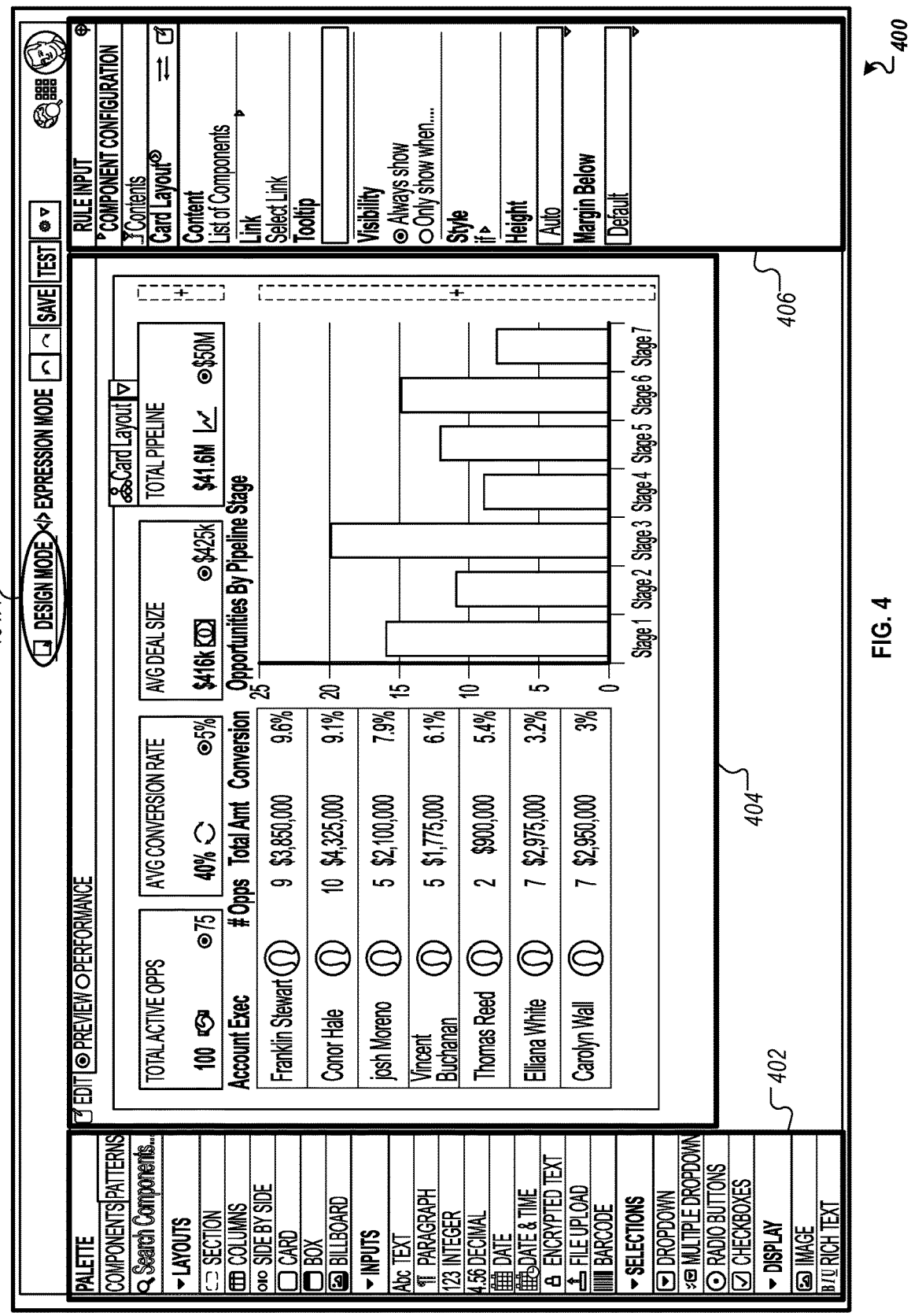
FIG. 4 illustrates an example of a design mode interface of a designer application.

The computing device 120 adjusts the application instance 122 based on the instruction received from the server 110. The adjustment can vary depending on the designer interface presently being accessed by the user when the instruction is received by the computing device 120. For example, if the user is presently accessing a design mode interface (as shown in FIG. 4), then the instruction causes a display of the electronic form within the viewing panel to be updated to reflect the update specified by the user input. Alternatively, if the user is presently accessing an expression mode interface (as shown in FIG. 5), then the instruction causes a change to code displayed in a text editor to reflect the updated program logic generated by the server 110 based on the user input. As discussed in reference to FIGS. 4 and 5, a user can dynamically switch between the design mode interface and the expression mode interface by selecting a tab for each mode through the application instance 122.

Figure 3:
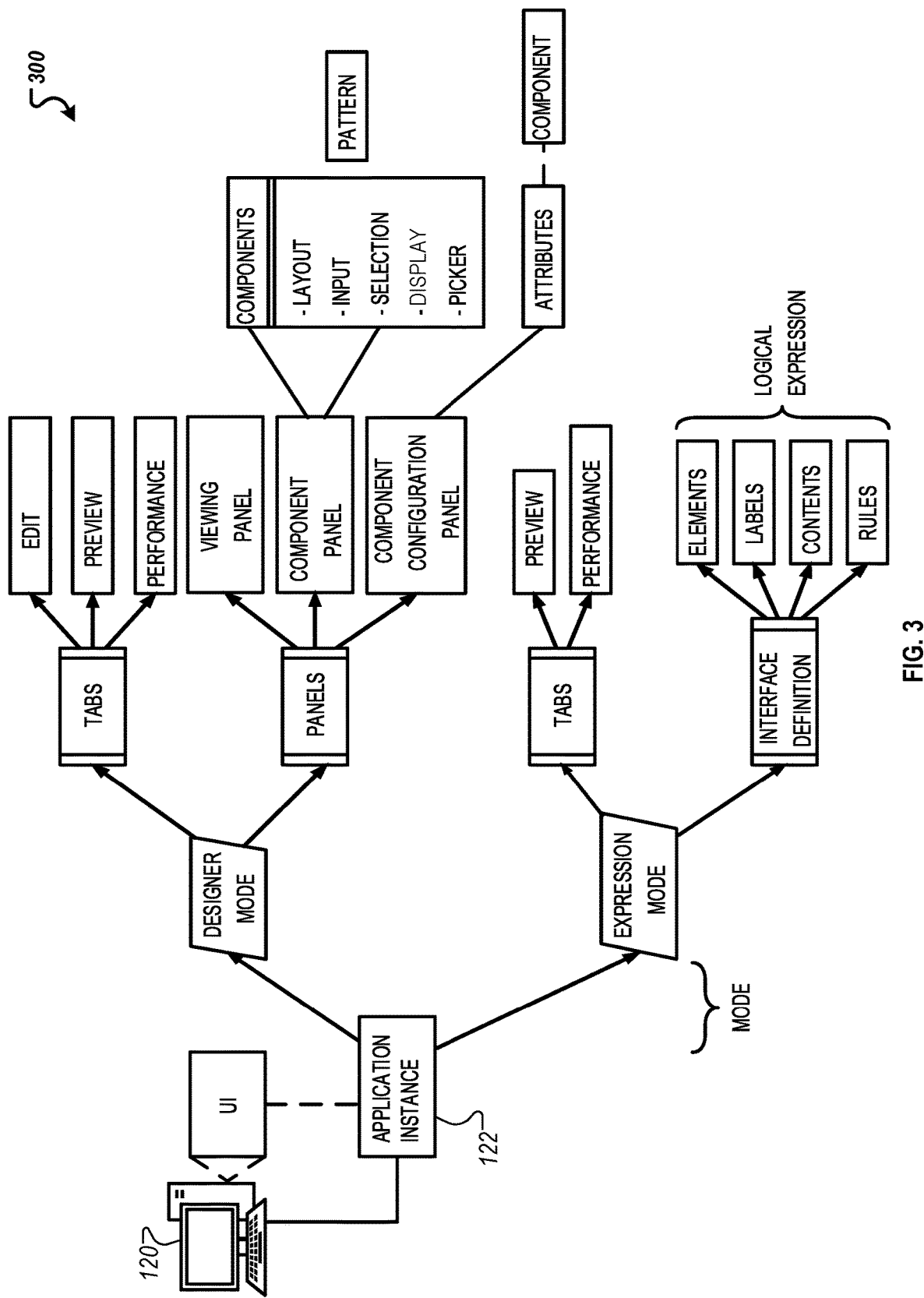
FIG. 3 illustrates an example of a hierarchical software framework for an application that can be used to design electronic forms.

FIG. 3 illustrates an example of a hierarchical software framework 300 for the application 112. As shown, the framework 300 includes multiple levels that each provide different types of functionalities for designing an electronic form through designer interfaces of the application 112. The framework 300 allows a user to use the application 112 in different ways, such as designing different types of electronic forms, using different techniques to design an electronic form, and thereby improving the level of customizability relative to other WSIWYG designer applications.

At the first level, the designer application 112 is capable of functioning in at least two different modes—(1) a designer mode, and (2) an expression mode. In the designer mode, the application 112 provides a visual interface that allows a user to view, access, and manipulate elements of an electronic form while it is being designed. In this way, a user can simultaneously design and test an electronic form and determine precisely how it will function in real-time within a production environment. An example of a design mode interface is depicted in FIG. 4.

In the expression mode, the application 112 provides a text editor that displays expression code to be used to build the electronic form. A user can view and make adjustments to the code in a similar manner as provided by many software development tools. In this way, if a user has software development expertise, he/she can use the expression mode to implement specific programmatic changes that may not be possible to implement using the design mode interface, such as creating variables for use in the program logic that defines the electronic form.

At the second level, the designer application 112 is configured to provide different aspects for each mode in which the application 112 operates. In the design mode, multiple tabs allow a user to access different functionalities involved in designing an electronic form. For example, in the preview tab, the designer application presents the electronic form on one of a variety of different devices (e.g., laptop, tablet, or smartphone) having a variety of resolutions, to provide the user with an understanding of how the interface would appear on such a device and what it would be like to interact with the electronic form on that device. In the edit tab, the user can add, configure, modify, and manipulate interface elements for components of the electronic form. In the performance tab, the user can view details regarding the time required to execute each component, run its underlying queries to the data source, and execute the operations specified in the program logic.

The design mode also provides multiple panels that each allow the user to perform a certain design function. For example, the component panel lists a set of components that can be introduced into an electronic form, the viewing panel presents a visual canvas where the user can manipulate interface elements to configure the layout of the electronic form, and the component configuration panel provides access to a set of attributes that can be adjusted for components of the electronic form. The user can use a "drag-and-drop" motion to select an interface element for a component within the component panel and move the selected interface element onto a designated location in the visual canvas of the viewing panel. Once inserted, the user can perform different actions to, for example, adjust the configuration of components, adjust the presentation of components, or adjust relationships between multiple components. Examples of actions are discussed in greater detail below.

In the expression mode, multiple tabs allow a user to access different functionalities involved in designing an electronic form in a similar manner as discussed above in reference to the design mode. The expression mode also provides an interface definition through a text editor to adjust program logic associated with the electronic form. As examples, the user can adjust elements, labels, contents, and rules that are defined in the program logic of the electronic form. As further examples, if the user is familiar with the syntax used by the ADP, the user can add new interface elements by specifying the necessary definition and attributes in the program logic of the electronic form. In addition, the user can cut or copy the expression corresponding to one or more components in interface definition text editor and paste them in another location, to programmatically alter the structure and content of the electronic form. As yet another example, the user can define local variables that can be used to store or manipulate data entered by the user into the electronic form.

FIG. 4 illustrates an example of a design mode interface 400 of the application 112. The interface 400 includes a component panel 402, a viewing panel 404, and a component configuration panel 406. Design mode offers interactive functionalities (e.g., "drag-and-drop" input) to increase the ease-of-use in designing the layout and configuration of an electronic form. For example, an electronic form can be designed visually, by dragging and dropping components, or programmatically, by generating components using expressions in the electronic form's program logic.

As shown in FIG. 4, the interface 400 provides a mode tab 401A that allows a user to switch between a designer mode (as shown in FIG. 4) and an expression mode (as shown in FIG. 5) of the application 112 while designing an electronic form. The user can switch between modes at any point in the design process, which enables, for instance, the capability to simultaneously design an electronic form visually (i.e., through the design mode) as well as programmatically (i.e., through the expression mode).

The interface 400 displays multiple panels that each impart different capabilities related to designing an electronic form. Briefly, a component panel 402 is used to select components to introduce into an electronic form. A viewing panel 404 is used as a visual canvas to provide a live view of an electronic form that is being designed by a user, as well as the ability to interact with components as they are being configured. A component configuration panel 406 is used to select and/or configure attributes that are uniquely associated with each component displayed in the viewing panel 404. The attributes displayed in the configuration panel 406 correspond to the currently selected component within the viewing panel 404.

The component panel 402 provides a list of interface elements that represent components a user can use in constructing the electronic form. A component, as described throughout, is an object used as a building block for an electronic form. Components are organized in the component panel 402 by component type, such as layouts, inputs, selections, display, action, grids, charts, pickers, and browsers. Each component classification provides a different type of interaction for the user in regards to the electronic form.

The component panel 402 also includes interface elements corresponding to patterns. Patterns are combinations of components that represent common interface features, such as a typical design of component arrangement and appearance that takes into account user interface best practices. Patterns also provide handling for basic interactivity to accelerate the creation of electronic forms. In some instances, patterns use hard-coded data to visualize component appearance and interactivity. A user can customize a pattern by replacing hard-coded data with data unique to a specific application. In some instances, patterns may include within the program logic associated with the components comments to guide users on which variables should be updated for customization.

The viewing panel 404 provides a WYSIWYG rendering of how the electronic form will appear in an application once implemented in a production environment. In addition, the viewing panel 404 provides a live view of the electronic form, performing all the operations in the same fashion as the electronic form does in the production environment. For instance, the live view of the electronic form allows the user to input data into the components and save that data into a data store and/or retrieve data from a data store into the components of the electronic form. The viewing panel 404 also allows users to interact with interface elements dragged from the component panel 402 and inserted into different locations of the viewing panel 404. For example, a user can drag a component from the component panel 402 onto the viewing panel 404 and place it wherever he/she prefers. In the example depicted in FIG. 4, a box 404A is placed around a "card layout" component, which indicates that the user previously selected that component (by clicking on it, but not dragging it).

The component configuration panel 406 can be used to set the values of the different attributes associated with a component that is selected in the viewing panel A display of the component configuration panel 406 is updated each time a user selects a different component to display only those attributes that are applicable to a selected component. In the example depicted in FIG. 4, once the user selects the "Card Layout" component, a display of the component configuration panel 406 is updated to provide the user with an option to set attributes of the "Card Layout" component, such as the component's tooltip, visibility, style, height, and other attributes. Once the user selects a new component, the display is adjusted once again to display a new set of attributes that are associated with the newly selected component in the configuration panel 406.

FIG. 5 illustrates an example of an expression mode interface 500 of the application 112. As discussed above, in the expression mode, a user can view and edit code that defines program logic for an electronic form, including expressions corresponding to components of the electronic form. The code can be written in expression language that takes declarative user interface definitions to generate dynamic, interactive, and multi-platform user experiences. For example, expressions can programmatically represent options for configurable interface elements that are displayed through the design mode of the application 112 (shown in FIG. 4).

The interface 500 displays multiple panels that each impart different capabilities related to designing an electronic form. An interface definition panel 502 is used to provide access the program logic of the expression that defines the contents of the electronic form in a text editor. A viewing panel 504 allows a user to view adjustments to the electronic form in real-time as changes are implemented into the program logic displayed in the interface definition panel 502.

The interface definition panel 502 enables users to programmatically adjust attributes of each component of an electronic form. In the example depicted in FIG. 5, the attributes for a formLayout component include "label," and "contents," among others. As is depicted in FIG. 5, formLayout is a container component that contains other components, the other components being defined within the "contents" attribute of the formLayout component. As another example of a component depicted in FIG. 5, the attributes for the textField component include "label," "labelPosition," "value," "saveInto," and others. The attributes can be edited directly in the text editor, as opposed to the component configuration panel 406 as depicted in FIG. 4. The components of the electronic form are updated in real-time in the viewing panel 504 as the user makes adjustments to the code in the text editor of the interface definition panel 502. In addition, the viewing panel 504 provides a live view of the electronic form, so the user can interact with the components of the electronic form and underlying data source in the same fashion as can be done in the production environment.

The design and expression modes of the application 112, as shown in FIGS. 4 and 5, can operate in concert with one another to enable persistence in component configurations during the construction of an electronic form. Persistence refers to the preservation of attributes and corresponding program logic for components as those components are moved, their data is edited, and/or the relationships between components are adjusted through the visual canvas provided in the design mode. To enable persistence, the application 112 creates a hierarchical model of the elements within the electronic form. When one of the user takes an action such as moving a component, editing its data, or adjusting its relationship to other components in the electronic form, server 110 persists the attributes of the affected component by rearranging elements in the hierarchical model, without changing any of the attributes of the rearranged elements. In this way, the attributes of the affected components are persisted when the user takes action that affects a component's location within the hierarchical model, for instance when moving the component to a new location on the electronic form.

As one example of persistence, the application 112 can identify and preserve conditional logic that is not present within a component itself, but surrounds it within program logic, and controls whether a component is displayed. Generally, the conditional display of a group of components can be accomplished in a variety of ways, as discussed below. For instance, each component in a group can have an attribute corresponding to its visibility set to check for whether the same condition were true. Alternatively, the user could use a container component, such as a "boxLayout" component, that can contain other components. The user can then control the visibility of all components within the container in a single place, using the showWhen attribute of the container component. In addition, a user may define logical conditions within an element's contents attribute, to determine which elements, if any, to display. In the aforementioned example in which a logical condition is used within a container component's contents attribute, meaning this condition is external to the program logic of the components defined within the contents attribute, the logical condition is persisted when any component within the container's contents attribute is moved. The application 112 identifies the component that is to be moved as well as the conditional display logic within the document's hierarchical model. The application 112 then moves the component to a new location within the hierarchical mode and also moves or copies the logical condition affecting that component to the new location. In this way, the logical condition is persisted after the component is moved to a new location in the electronic form.

As another example of persistence, the application 112 can preserve data input into components during a drag-and-drop operation. As an example, a user initially inserts a new list element in a list component contained within a boxLayout component. The user then initiates a drag action by clicking the title bar of that component. While the user is dragging the boxLayout component around the screen, the new list element the user previously inserted into the list component remains displayed. The new list element is also preserved after the user drops the component in place by releasing the mouse button. Once the component is dropped, other list elements that were previously input, and displayed in the first position in the component, are also preserved after movement. In this way, certain adjustments to a component (i.e., inserting a new list element) are preserved while other subsequent adjustments are performed on the component (i.e., moving the list component from the first location to the second location).

In some implementations, the application 112 can account for arbitrary levels of nesting within components. For instance, in one example, a user can drag a boxLayout component so it can be located in number of locations at a variety of nesting levels. In this example, the application 112 is able to drop the boxLayout component between two components labeled "Department" and "Special Instructions" (i.e., within both the sectionLayout and columnLayout components). Alternatively, the user can drop the boxLayout component within a left-hand columnLayout component below the component labeled "Special Instructions," or the user can drop the boxLayout outside the sectionLayout altogether and its width can be adjusted accordingly.

In some implementations, the application 112 enforces syntax of the ADP to ensure components are properly nested within other components as a result of dragging a component from outside a container component and dropping it inside the container component. For example, the ADP may require certain components, like a button, to be contained within a layout component, such as a "buttonLayout" component. If the user drops the button into a location where there is no container component (e.g., dropping a button outside a buttonLayout component), the ADP can generate the necessary container component and insert the dropped component within the container component (e.g., creating a buttonLayout component at the dropped location and inserting the button into the buttonLayout component). In another example, the ADP may determine that the user does not intend for a container component to be created at the dropped location and prevent the component from being dropped at that location.

Figure 6A:
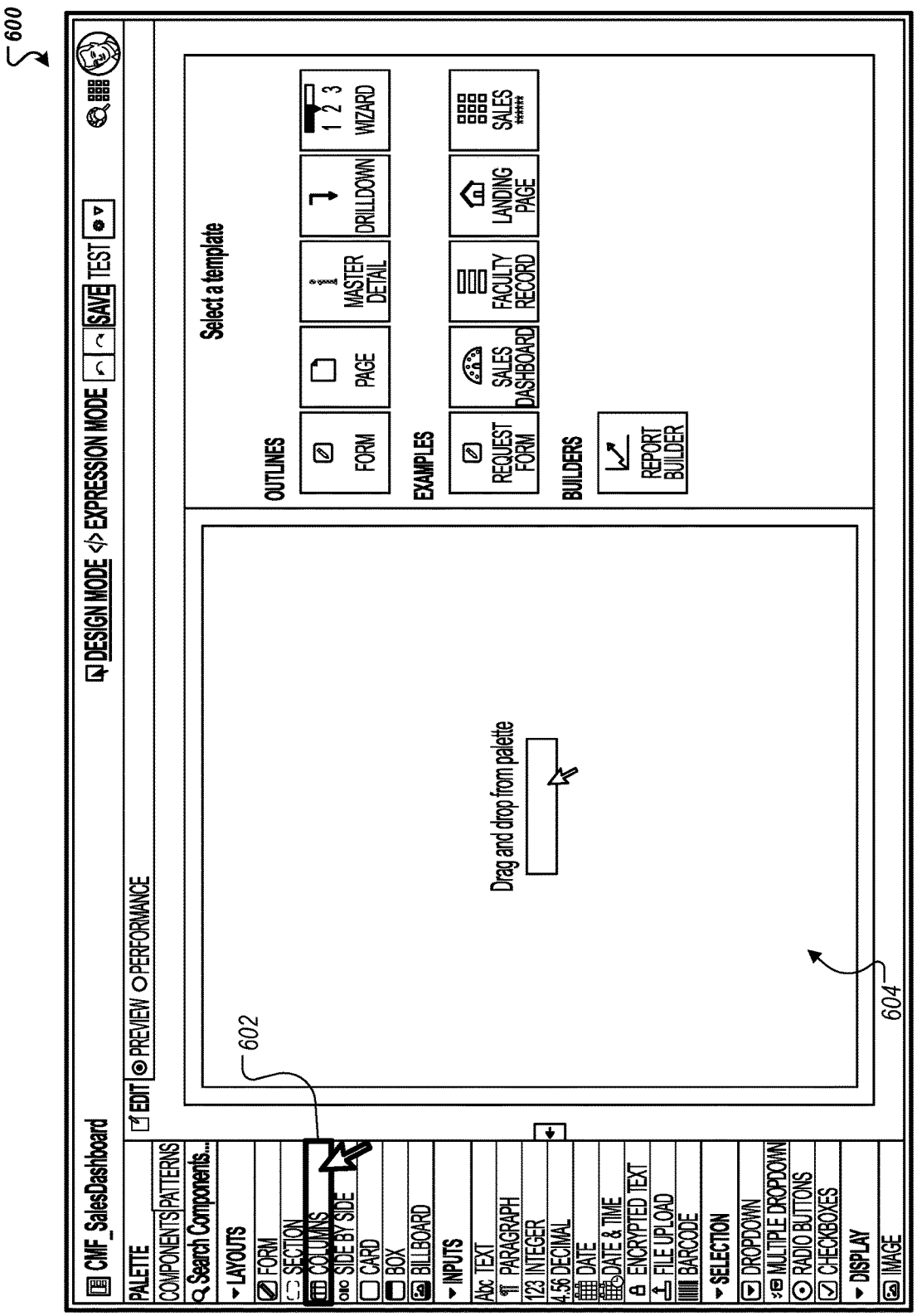
FIGS. 6A-6C illustrate an example of a sequence of user actions on a design mode interface that allow a user to insert a new component into an electronic form.
Figure 6B:
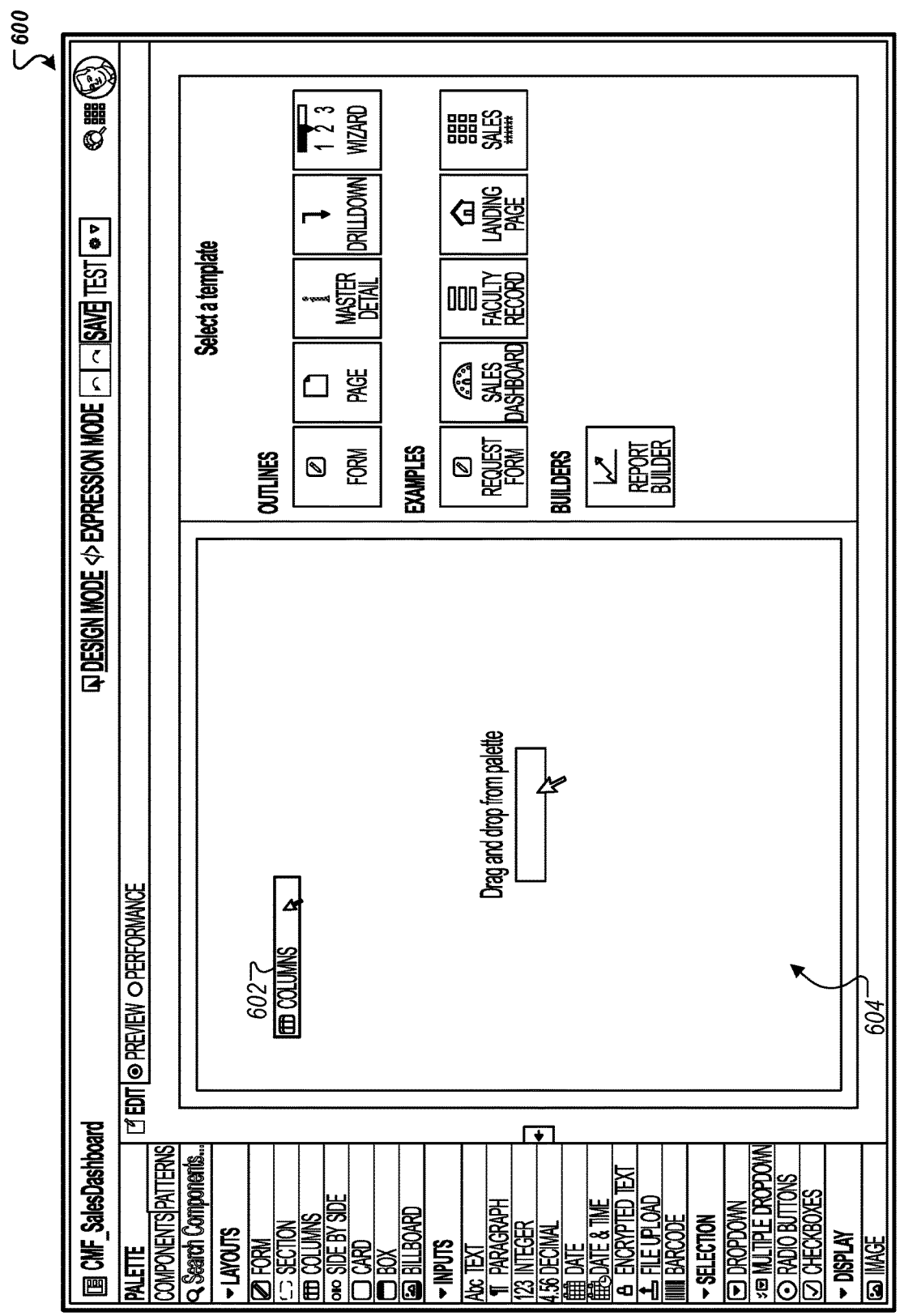
Figure 6C:
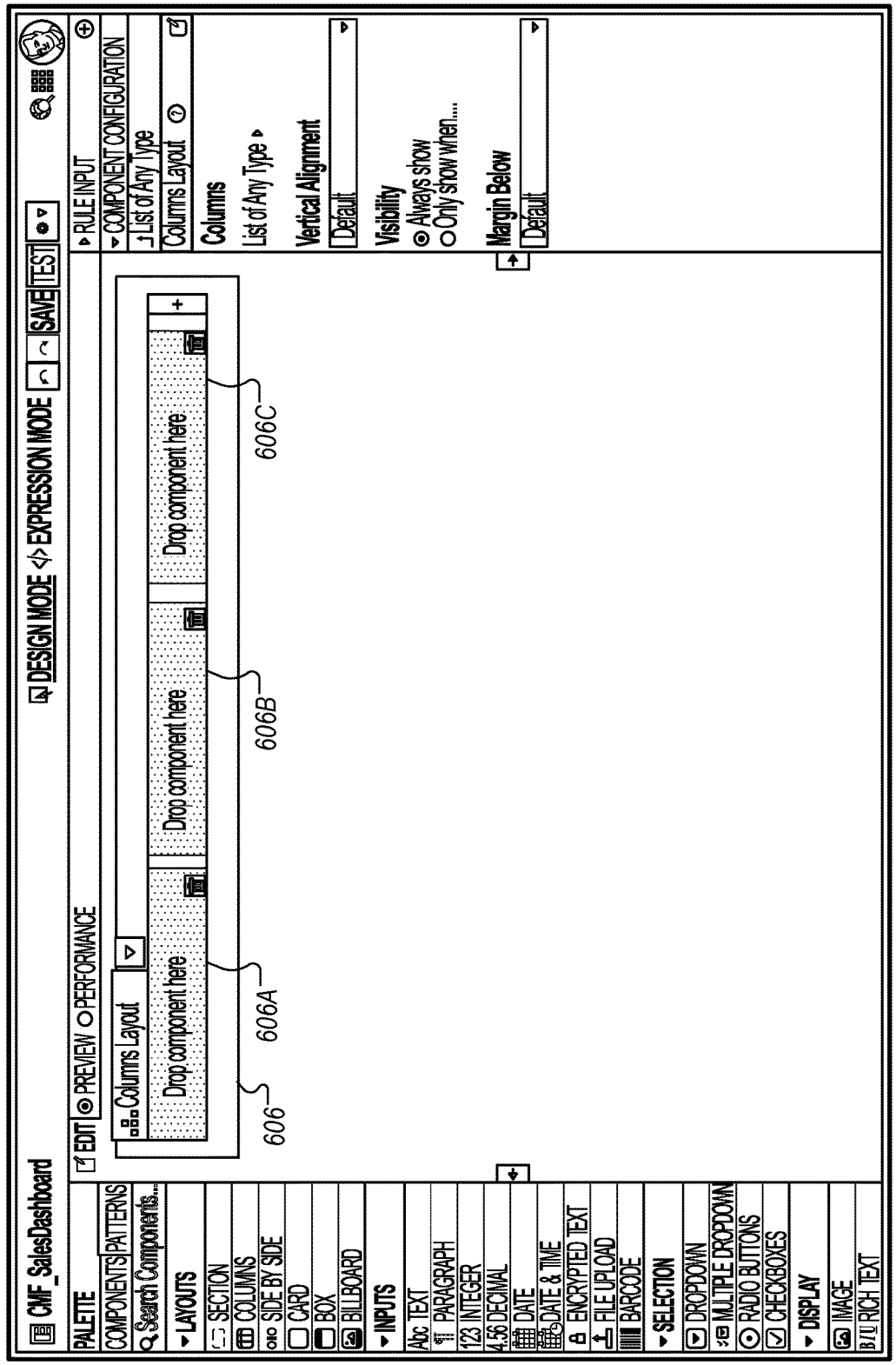

FIGS. 6A-6C illustrate an example of a sequence of user actions on an interface 600 used to insert an interface element as a new component into an electronic form. A user initially navigates to a component panel and selects an interface element 602 corresponding to a "columns" component, as shown in FIG. 6A. The user then drags the selected interface element 602 onto a visual canvas 604 provided in a viewing panel, as shown in FIG. 6B. The interface 600 then generates a columns layout component in a new electronic form, as shown in FIG. 6C. The columns layout component 606 generates three areas 606A, 606B, and 606C where form components can be introduced. For example, the user can select an interface element corresponding to a "section" component from the component panel and insert it into one of the areas. This causes a "section" component to be generated in the corresponding area, and an association between the "columns layout" component and the "section" component. In this example, because the "section" component is placed within a region enclosed by the "columns layout" component, program logic for the electronic form is generated such that it represents a hierarchal relationship between the two components (e.g., an expression for the "section" component is nested within a portion of the program logic corresponding to an expression for the "columns layout" component).

Figure 7:
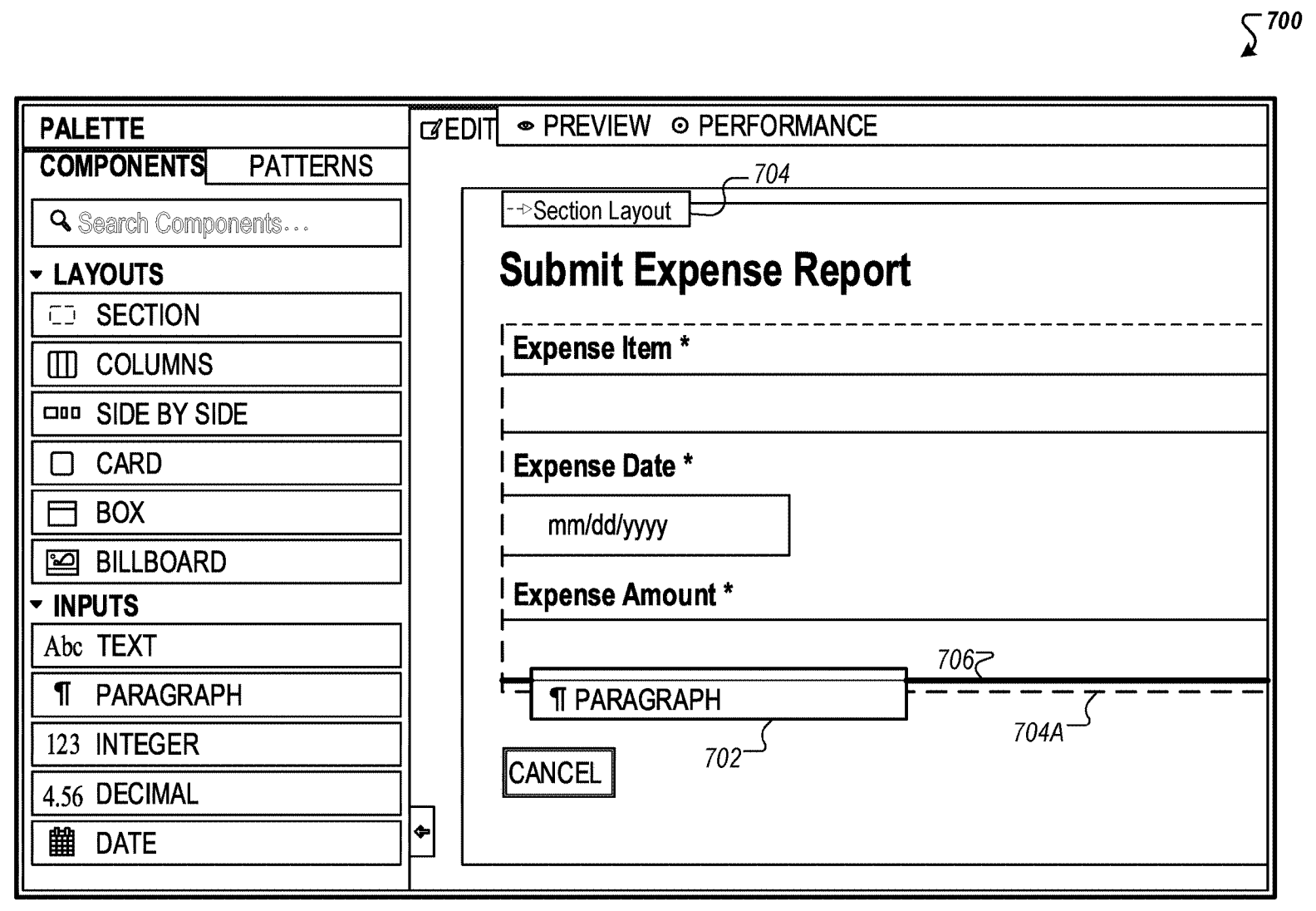

FIG. 7 illustrates an example of a nested relationship between components of an electronic form. In this example, a user selects a "paragraph" component 702 that was previously introduced into the viewing panel of an interface 700. The user drags the component 702 from a first location of the electronic form that is outside of a region 704A associated a "Section Layout" component 704 to a second location of the electronic form that is inside the region 704A. The boundaries of the region 704A are provided by a dotted line that informs the user that components placed inside the region 704A result in an association with the component 704.

Before the user places the component 702 inside by the region 704A (by releasing a mouse click or touch input controlling a dragging motion), a visual indicator 706 is displayed within the region 704A to show a user that the component 702 can be inserted underneath a text box labeled "Expense Amount." If dropped, the component 702 is then moved to the second location and an association is generated between the components 702 and 704. Any attribute values that were previously configured for the component 702 (e.g., text size, font type) persist between the change in location from the first location to the second location. This ensures that the user's prior configurations are not lost as he/she rearranges configured components within a layout of the electronic form. In addition, any text the user has typed into the paragraph component prior to the drag and drop operation persists between the change from the first to the second location. This ensures that data is not lost as components are rearranged. This functionality is provided because, as discussed above, the electronic forms that the user can edit in the application instance are fully operational versions, as they would exist in a production environment.

Figure 8:
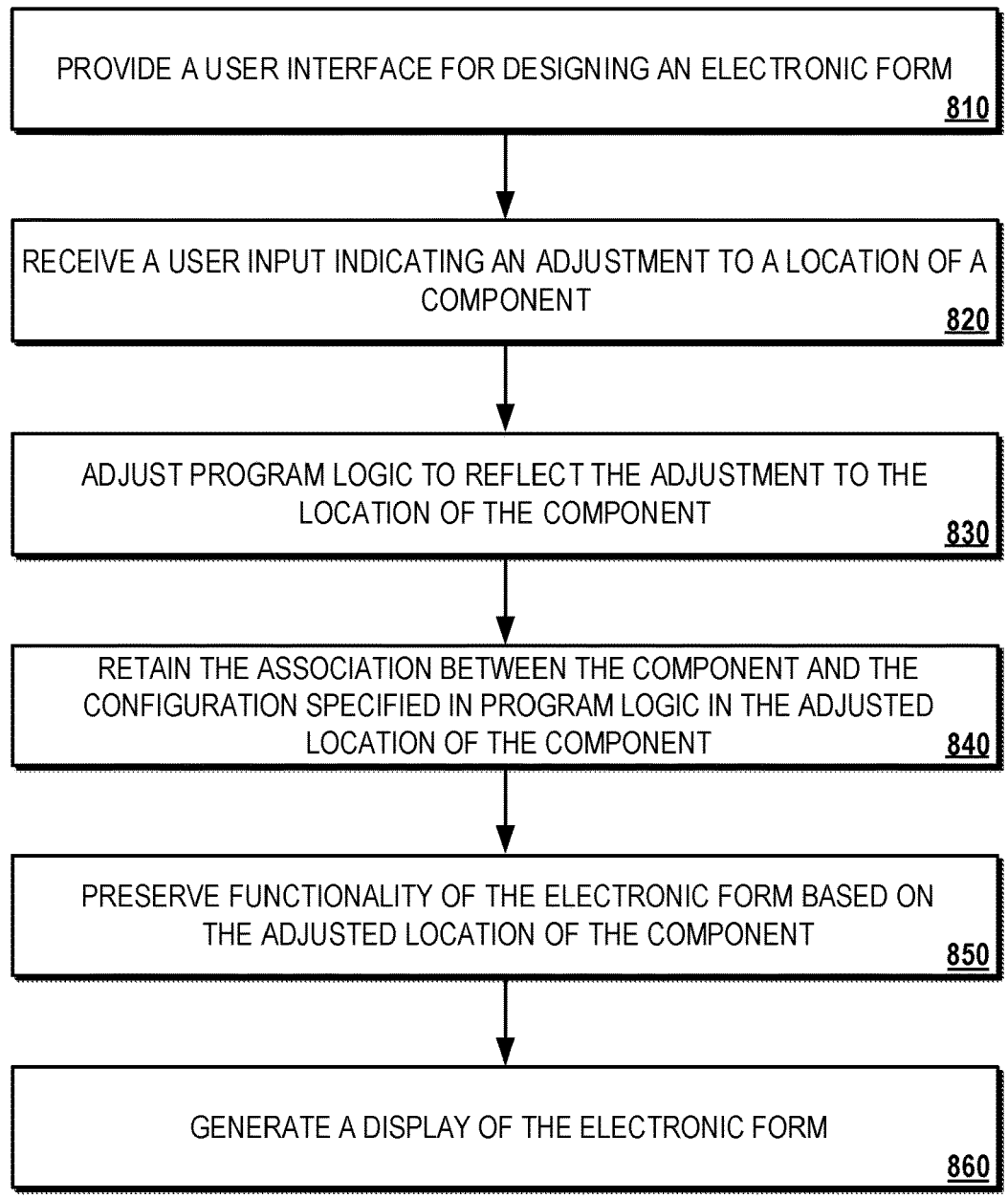
FIG. 8 illustrates an example of a process for dynamically configuring an electronic form through an application.

FIG. 8 illustrates an example of a process 800 for dynamically configuring an electronic form through an application. Briefly, the process 800 includes the operations of providing a user interface for designing an electronic form (810), receiving a user input indicating an adjustment to a location of a component (820), adjusting program logic to reflect the adjustment to the location of the component (830), retaining the association between the component and the configuration specified in program logic in the adjusted location of the component (840), preserving functionality of the electronic form based on the adjusted location of the component (850), and generating a display of the electronic form (860).

In more detail, the process 800 includes the operation of providing a user interface for designing an electronic form (810). For example, the server 110 can execute the application 112 that can be accessed by the computing device 120 through the application instance 122. As discussed throughout, the application instance 122 can be accessed through a webpage, or alternatively, through a native application that accesses resources hosted on the server 110 in association with the ADP 100. The application 112 can provide various designer interfaces that allow a user to design and/or construct an electronic form for an application developed through the ADP 100. For example, in some instances, the application 112 provides the interface 400, which represents a design mode interface that provides a WYSIWYG editor allowing a user to view an end result of the electronic form while the electronic form is created (shown in FIG. 4). In other another instances, the application 112 provides the interface 500, which represents an expression mode interface that provides a text editor including program logic generated by the server 110 for the electronic form as it is being created (shown in FIG. 5).

In the design mode operation, the interface 400 includes the component panel 402, the viewing panel 404, and the component configuration panel 406. Design mode offers interactive functionalities (e.g., "drag-and-drop" input), which increases the ease-of-use in designing the layout and configuration of an electronic form. For example, an electronic form can be designed visually, by dragging and dropping components, or programmatically, by generating components using expressions. The user can select a component from the component panel 402 and introduce an interface element for the selected component into the viewing panel of 404. Once introduced, the component is associated with a first configuration specified in program logic for the electronic form. For example, if the component has been newly introduced into the viewing panel 404, then the first configuration can represent a default configuration for the component. The configuration can specify values for a list of attributes for the component, as discussed above.

The process 800 includes the operation of receiving a user input indicating an adjustment to a location of a component (820). For example, the server 110 can receive a drag-and-drop input that moves a component of the electronic form from one location to another location within a visual canvas of the viewing panel 404. The user can use a cursor to select and drag the component relative other components of the electronic form. As discussed below, the adjustment results in an adjustment to the program logic used to configure the electronic from.

In some implementations, the adjustment can represent other types of changes to the component, such as a change to an attribute value for the component. For example, if the component is a list component that specifies a selectable list of elements, the adjustment can be to add a new element to the existing list. As another example, the adjustment can be a change to the layout or presentation of the component when displayed in the electronic form. In some other examples, the adjustment be a change to the behavior of the component as it relates to actions performed while a user interacts with the electronic form, or in relation to other components of the form. For instance, the adjustment can specify that a first component that provides additional information be displayed, or even be displayed at all, only when an element in a second component is selected. In this instance, the display of the first component is dependent on the selection made in the second element (thus, the display behavior of the first element is made conditionally dependent on the second element). Other examples of adjustments are discussed throughout this specification.

In some implementations, the configuration specifies two types of program logic associated with the component. For example, the configuration can specify program logic that defines the component (e.g., a set of values that define attributes associated with a display of the component in the electronic form). The configuration can also specify program logic external to or otherwise non-adjacent to the program logic defining the component (e.g., program logic that affecting the display or behavior of the component). In such implementations, the configuration can also specify the content of a component (e.g., text that is displayed in a region of the electronic form corresponding to the component) and how and when the content is displayed (e.g., displaying text in response to certain user interactions with the electronic form). As discussed below, if a location of the component is adjusted in the electronic form, the server 110 can retain the configuration so that both the content and the display techniques associated with a component are preserved once the component is placed in a new location.

The process 800 includes the operation of adjusting program logic to reflect the adjustment to the location of the component (830). For example, the server 110 can modify existing program logic for the electronic form to reference a new location of the component in the electronic form. The adjustment can be performed so that the program logic reflects the new location but maintains the existing configuration for the component relative to the components of other components of the electronic form. For example, the server 110 can adjust a portion of the program logic specifying the present location of the component such that the portion of the program logic reflects the new location. In this example, the server 110 maintains another portion of the program logic that specifies values for the list of attributes indicated by the configuration such that this portion of the program logic specifies the same values when the component is placed in the new location. As described throughout, the server 110 accomplishes this adjustment since the program logic is constructed using a set of nested expressions for each component. The expression corresponding to the configuration of the component within the program logic is maintained, while the portion of the program logic specifying locations of components is adjusted. This ensures that program logic corresponding to a component is adjusted while program logic corresponding to other components of the electronic form is maintained.

In some implementations, where the user input additionally specifies an adjustment to the configuration of the component, the server 110 can determine another configuration for the component. For example, in response to receiving the user input, the server 110 can determine a second configuration for the component. The second configuration can represent adjustments to attribute values based on the user input. For example, if the user adjusts a the text used for a component's label, then the second configuration references the adjusted label as opposed to the initial label. As another example, if the adjustment represents the addition of a new component (e.g., adding a new text box element within a Section Layout), then the second configuration can be updated to reference the new component. In some other examples, where the adjustment references a relationship to another element (e.g., having the display of one element conditionally dependent on the content of another element), the second configuration can reference the other element.

In some implementations, the server 110 can adjust program logic for the electronic form to reflect a second configuration in the instances where the user input adjusts the configuration of the component. As discussed above, the server 110 can adjust the program logic in real-time so the electronic form is reconstructed according to the second configuration without requiring the user to, for instance, access a different interface, press a button to confirm the adjustment, publish the electronic form, or copy files and/or directories to a production environment. For instance, once a user has reconfigured a component, the program logic can be updated in real-time so that the user can see the live view of the electronic form, test the updated component as it will function in the production environment, and interact with production data, without having to compile program code or take any further steps to ensure the update to the electronic form is reflected in the production environment.

The process 800 includes the operation of retaining the association between the component and the configuration specified in program logic in the adjusted location of the component (840). For example, the server 110 can retain the association between the component and the configuration for the component when it was located in an initial location (i.e., the location of the component in the viewing panel 404 prior to receiving the user input in step 820). In this way, the server 110 retains prior configurations in program logic even while a location of the component in the electronic form is adjusted. For example, a prior change to the font used to display text in a text box that is processed when the text box in located in a first location is retained in the program logic after a user input specifying an adjustment to a second location is received.

The process 800 can include the operation of preserving functionality of the electronic form based on the adjusted location of the component (850). For example, the server 110 can enable persistence when a component is moved to different locations in the viewing panel 404 (e.g., from a first location to a second location) so that different types of adjustments can be processed in parallel. As an example, if the configuration for the component remains the same between location adjustments, then the portion of the program logic corresponding to the configuration is maintained even though another portion of the program logic specifying a present location of the component in the electronic form is adjusted.

The process 800 can include the operation of generating a display of the electronic form (860). For example, the server 110 can generate a display of the electronic form within the viewing panel 404. As described throughout, the display can be generated in real-time so that a user can view, access, and/or test the electronic form in the design mode interface.

In some implementations, the process 800 includes the operation of storing data representing the adjusted program logic. For example, the server 110 can store data representing the adjusted program logic such that the component remains associated with the configuration when the component is moved to a different location within the viewing panel 404.

In some implementations, the server 110 stores program logic to reflect changes in a configuration for the component. For example, if a list component is updated to include a new element, then the program logic is stored such that when the list component is moved to a different location, the new element still exists within the list component when it is moved to the second location. This technique increases the ease of use in constructing the electronic form as a whole as a user can freely re-adjust the layout and location of components and/or groups of components within the electronic form without having to re-do and/or readjust individual configurations of any of those components. In this way, the program logic for the electronic form is contained in expressions that are each associated with each component.

In some implementations, the process 800 includes the operation of determining if the adjusted location of the component indicated by the user input is a valid location for the component. For example, the server 110 can determine whether the user input specifies an adjusted location that is inconsistent with the configuration for another component that is already associated with the electronic. In this example, the server 110 only adjusts the configuration, retains the association between the component and the configuration specified in program logic in the adjusted location of the component, preserves the functionality of the program logic for the electronic form, and generates the display of the electronic form if the adjusted location is a determined to be a valid input location. If the adjusted location is determined to be an invalid input location, then the designer application can provide a notification that either informs a user that the user input is invalid, or prevents adjustment and requests a user to specify another location. For example, if the component is sized such that moving the component to a lower region of the electronic form exceeds the vertical boundary of the electronic form, then the server 110 can display a notification through the designer application that informs the user that the adjusted location is an invalid placement for the component.

In some implementations, the process 800 includes operations related to a container component. A container component can refer to a specific type of component that encompasses other components that are placed within it. A container component can be a layout component that organizes multiple text box components that are placed inside the layout component in the electronic form. In some instances, the server 110 determines that a component is a type that requires a container component when positioned in the electronic form. In such instances, the server 110 can determine that the adjusted location of the component indicated by the user input is not inside a container component associated with the component. In such instances, the server 110 can determine that the adjusted location is not inside a container component. Based on this determination, and the determination that the type of the content requires a container component, the server 110 creates a container component at the adjusted location indicated by the user input before adjusting the configuration of the component based on the adjusted location.

In some instances, where a component is a type that requires a container component, the server 110 can retain configurations of the component, as well its container component in relation to an adjustment to the location of the component in an electronic form. For example, the server 110 can determine that the component is the only component that is included in the container component. In this example, when moving the component to the adjusted location specified by the user input, the server 110 retains both an association between the component and the configuration specified by program logic, as well as an association between the container component and the configuration. In this way, the server 110 can maintain relationships between the container component and other components of the electronic form in relation to adjusting a component within the container component.

Figure 9:
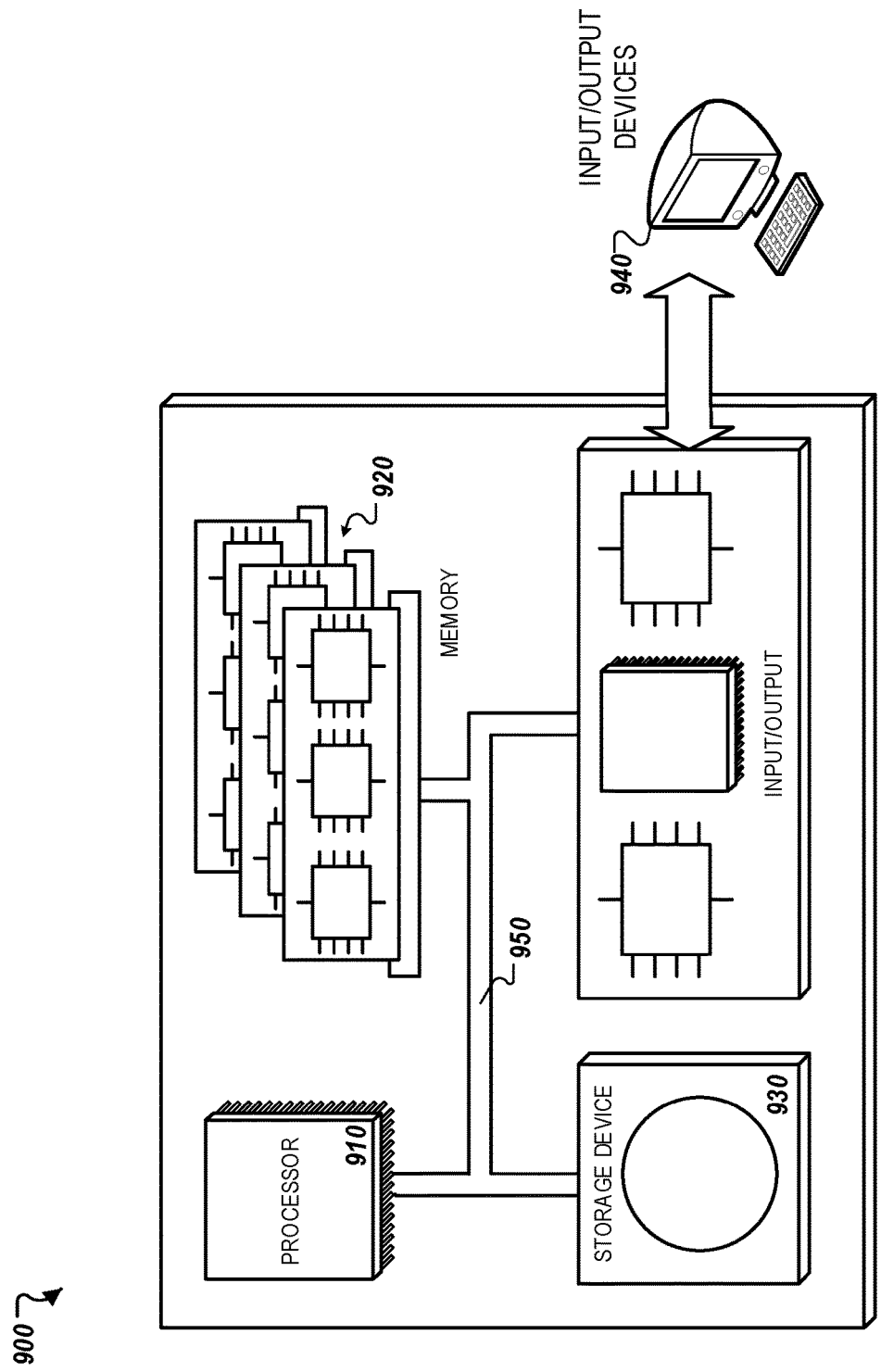
FIG. 9 illustrates a schematic diagram of a computer system that may be applied to any of the computer-implemented methods and other techniques described herein.

FIG. 9 illustrates a schematic diagram of a computer system 900 that may be applied to any of the computer-implemented methods and other techniques described herein. The system 900 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 900) and their structural equivalents, or in combinations of one or more of them. The system 900 is intended to include various forms of digital computers, such as laptops, desktops, workstations, personal digital assistants, servers, blade servers, mainframes, and other appropriate computers, including vehicles installed on base units or pod units of modular vehicles. The system 900 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 900 includes a processor 910, a memory 920, a storage device 930, and an input/output device 940. Each of the components 910, 920, 930, and 940 are interconnected using a system bus 940. The processor 910 is capable of processing instructions for evaluation within the system 900. The processor may be designed using any of a number of architectures. For example, the processor 910 may be a CISC (Complex Instruction Set Computers) processor, a RISC (Reduced Instruction Set Computer) processor, or a MISC (Minimal Instruction Set Computer) processor.

In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for evaluation by a programmable processor; and method steps can be performed by a programmable processor evaluating a program of instructions to perform functions of the described implementations by operating on input data and generating output. The described features can be implemented advantageously in one or more computer programs that are evaluable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the evaluation of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for evaluating instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
  generating, based on program logic, a first display of an electronic form comprising a component,
    the program logic comprising (i) a first portion specifying a location of the component and (ii) a second portion that is external to the component and specifies values assigned to the component;
  receiving data indicating an adjustment to the location of the component; and
  in response to receiving the data indicating the adjustment to the location of the component, adjusting the program logic to reflect the adjustment to the location of the component, wherein the program logic is adjusted such that:
    an association between the location and the values is retained, and
    dependency between the first portion and the second portion is preserved; and
  generating a second display of the electronic form based on the adjusted program logic.

2. The method of claim 1, wherein the component permits a user to input data in the component through a user interface.

3. The method of claim 2, wherein prior to the step of receiving data indicating an adjustment to the location of the component, the method comprises the step of receiving, via the user interface, data indicative of text entered by a user into the component.

4. The method of claim 2, further comprising the step of displaying the data entered by the user into the component through the user interface in the component at the adjusted location.

5. The method of claim 1, wherein the first portion of the program logic specifies a configuration of the component, and the configuration comprises conditional logic affecting the display of the component.

6. The method of claim 1, wherein the first portion of the program logic specifies a configuration of the component, and the configuration comprises values for a list of attributes assigned to the component.

7. The method of claim 6, wherein the configuration comprises conditional logic affecting the display of the component which is external to the list of attributes assigned to the component.

8. The method of claim 1, wherein the step of generating the first display or the second display of the electronic form is performed in real-time.

9. The method of claim 1, comprising:
  receiving, via a user interface, data indicative of text entered by a user into the component, wherein:
    the user interface further comprises a component panel that displays a list of components; and
    the component is selected from among the list of components and introduced into a viewing panel enabling configuration of a layout of the electronic form.

10. The method of claim 1, comprising:
  receiving, via a user interface, data indicative of text entered by a user into the component, wherein:
    the user interface further comprises a component configuration panel that displays a set of attributes that can be assigned to one or more components displayed in a viewing panel enabling configuration of a layout of the electronic form;
    the component configuration panel further configured to display values of the set of attributes that can be assigned to the one or more components displayed in a viewing panel enabling configuration of a layout of the electronic form.

11. A computer-implemented method comprising:
  generating, based on program logic, a first display of an electronic form comprising a component,
    the program logic comprising (i) a first portion specifying a location of the component and (ii) a second portion that is external to the component and specifies values assigned to the component;
  receiving data indicating an adjustment to the location of the component; and
  in response to receiving the data indicating the adjustment to the location of the component, adjusting the program logic to reflect the adjustment to the location of the component, wherein the program logic is adjusted such that:
    an association between the location and the values is retained, and
    dependency between the first portion and the second portion is preserved;
  determining a configuration for the component based on the adjusted program logic; and
  generating, utilizing the configuration, a second display of the electronic form.

12. The method of claim 11, wherein the program logic is generated in real-time, in response to receiving user input that indicates user selection of the component and insertion of the component into a viewing panel enabling configuration of a layout of the electronic form.

13. The method of claim 11, comprising:
  receiving, via a user interface, data indicative of text entered by a user into the component, wherein the user interface further comprises:
    a component panel that displays a list of components available for inclusion in the electronic form.

14. The method of claim 13, wherein the user interface further comprises:
  a component configuration panel that displays a set of attributes that are assigned to each component included in the list of components.

15. The method of claim 11, further comprising:
  generating the electronic form based on the program logic; and
  providing the first display or the second display of the generated electronic form for output through a user interface configured to receive text input from a user.

16. The method of claim 15, wherein the electronic form is generated in real-time in response to receiving user input that indicates user selection of the component and insertion of the component into a viewing panel enabling configuration of a layout of the electronic form.

17. The method of claim 15, wherein the generated display of the electronic form permits a user to input data in the component through the user interface.

18. A computer-implemented method comprising:
Generating, based on program logic, a first display of an electronic form comprising a component,
the program logic comprising (i) a first portion specifying a location of the component and a configuration of the component (ii) a second portion that is external to the component and specifies values assigned to the component;
receiving data indicating an adjustment to the location of the component; and
in response to receiving the data indicating the adjustment to the location of the component, adjusting the program logic to reflect the adjustment to the location of the component, wherein the program logic is adjusted such that:
an association between the location and the values is retained, and
dependency between the first portion and the second portion is preserved; and
generating a second display of the electronic form based on the adjusted program logic.

19. The method of claim 18, wherein the electronic form permits a user to input data in the component through a user interface.

20. The method of claim 18, wherein the step of generating the first display or the second display of the electronic form is performed in real-time.

* * * * *

UNITED STATES PATENT AND TRADEMARK OFFICE
CERTIFICATE OF CORRECTION

PATENT NO. : 12,333,128 B2  
APPLICATION NO. : 18/432228  
DATED : June 17, 2025  
INVENTOR(S) : John Rogers et al.

Page 1 of 1

It is certified that error appears in the above-identified patent and that said Letters Patent is hereby corrected as shown below:

In the Claims

In Column 32, Line 20-21, Claim 10 please replace "a viewing panel enabling configuration of a layout of the electronic form." with --the viewing panel.--

Signed and Sealed this
Twenty-eighth Day of October, 2025

John A. Squires
*Director of the United States Patent and Trademark Office*